United States Patent
Masago et al.

(10) Patent No.: US 8,956,735 B2
(45) Date of Patent: Feb. 17, 2015

(54) COPPER ALLOY AND ELECTRICALLY CONDUCTIVE MATERIAL FOR CONNECTING PARTS, AND MATING-TYPE CONNECTING PART AND METHOD FOR PRODUCING THE SAME

(75) Inventors: Yasushi Masago, Shimonoseki (JP); Koichi Taira, Shimonoseki (JP); Toshiyuki Mitsui, Kitakyushu (JP); Junichi Kakumoto, Kitakyushu (JP)

(73) Assignees: Kabushiki Kaisha Kobe Seiko Sho, Kobe-shi (JP); Shinko Leadmikk Co., Ltd., Kitakyushu-shi (JP)

( * ) Notice: Subject to any disclaimer, the term of this patent is extended or adjusted under 35 U.S.C. 154(b) by 446 days.

(21) Appl. No.: 13/069,016

(22) Filed: Mar. 22, 2011

(65) Prior Publication Data

US 2011/0236712 A1    Sep. 29, 2011

(30) Foreign Application Priority Data

Mar. 26, 2010 (JP) ................. 2010-073199
Mar. 26, 2010 (JP) ................. 2010-073502

(51) Int. Cl.
  *B32B 3/30*   (2006.01)
  *B32B 15/01*  (2006.01)
  *H01R 43/16*  (2006.01)
  (Continued)

(52) U.S. Cl.
  CPC .............. *H01R 43/16* (2013.01); *B32B 15/00* (2013.01); *C23C 28/021* (2013.01); *C25D 5/10* (2013.01); *C25D 5/12* (2013.01); *C25D 5/34* (2013.01);
  (Continued)

(58) Field of Classification Search
  USPC .......................... 428/647–648, 668–669, 671
  See application file for complete search history.

(56) References Cited

U.S. PATENT DOCUMENTS 7,871,710 B2    1/2011 Masago et al.
2008/0090096 A1* 4/2008 Suzuki et al. ................. 428/674
(Continued)

FOREIGN PATENT DOCUMENTS

CN       1985333 A     6/2007
JP       2004-300524   10/2004
(Continued)

OTHER PUBLICATIONS

Partial Search Report issued May 24, 2011, in European Patent Application No. 11002424.7.
(Continued)

*Primary Examiner* — Gwendolyn Blackwell
*Assistant Examiner* — Lucas Wang
(74) *Attorney, Agent, or Firm* — Oblon, Spivak, McClelland, Maier & Neustadt, L.L.P.

(57) ABSTRACT

A mating-type connecting part can be obtained by stamping and surface-roughening a copper sheet into a predetermined shape with depressions as a plurality of parallel lines. The copper sheet then has a roughness of from 0.5 μm to 4.0 μm parallel to a sliding direction upon connection, a mean projection-depression interval of from 0.01 mm to 0.3 mm in that direction, a skewness less than 0, and a protrusion peak portion height of 1 μm or less. The copper sheet is then plated with Cu and Sn, followed by reflowing. The result is a connecting part having a Sn surface coating layer group as a plurality of parallel lines, and a Cu-Sn alloy coating layer adjacent to each side of each Sn surface coating layer.

17 Claims, 13 Drawing Sheets

(51) Int. Cl.
  *H01R 43/00* (2006.01)
  *B32B 15/00* (2006.01)
  *C23C 28/02* (2006.01)
  *C25D 5/10* (2006.01)
  *C25D 5/12* (2006.01)
  *C25D 5/34* (2006.01)
  *C25D 5/50* (2006.01)
  *H01R 13/03* (2006.01)

(52) U.S. Cl.
  CPC  *C25D 5/50* (2013.01); *C25D 5/505* (2013.01); *H01R 13/03* (2013.01)
  USPC ........... 428/647; 428/648; 428/668; 428/674; 29/874; 29/885

(56) References Cited

U.S. PATENT DOCUMENTS

| | | |
|---|---|---|
| 2008/0257581 A1 | 10/2008 | Masago et al. |
| 2009/0053553 A1 | 2/2009 | Masago et al. |
| 2010/0163277 A1 | 7/2010 | Masago et al. |
| 2010/0247959 A1 | 9/2010 | Taira et al. |
| 2010/0304016 A1 | 12/2010 | Suzuki et al. |

FOREIGN PATENT DOCUMENTS

| | | |
|---|---|---|
| JP | 2005-105307 | 4/2005 |
| JP | 2005-183298 | 7/2005 |
| JP | 2006-77307 A | 3/2006 |
| JP | 2006-183068 A | 7/2006 |
| JP | 3926355 | 3/2007 |
| JP | 2007-258156 | 10/2007 |
| JP | 4024244 | 10/2007 |
| JP | 2008-269999 | 11/2008 |
| JP | 2008-274364 | 11/2008 |
| WO | WO 2009/123144 A1 | 10/2009 |

OTHER PUBLICATIONS

Office Action issued Jul. 4, 2013, in European Patent Application No. 11 002 424.7.

Extended European Search Report issued on Aug. 5, 2011 in the corresponding European Application No. 11002424.7.

* cited by examiner 111  112

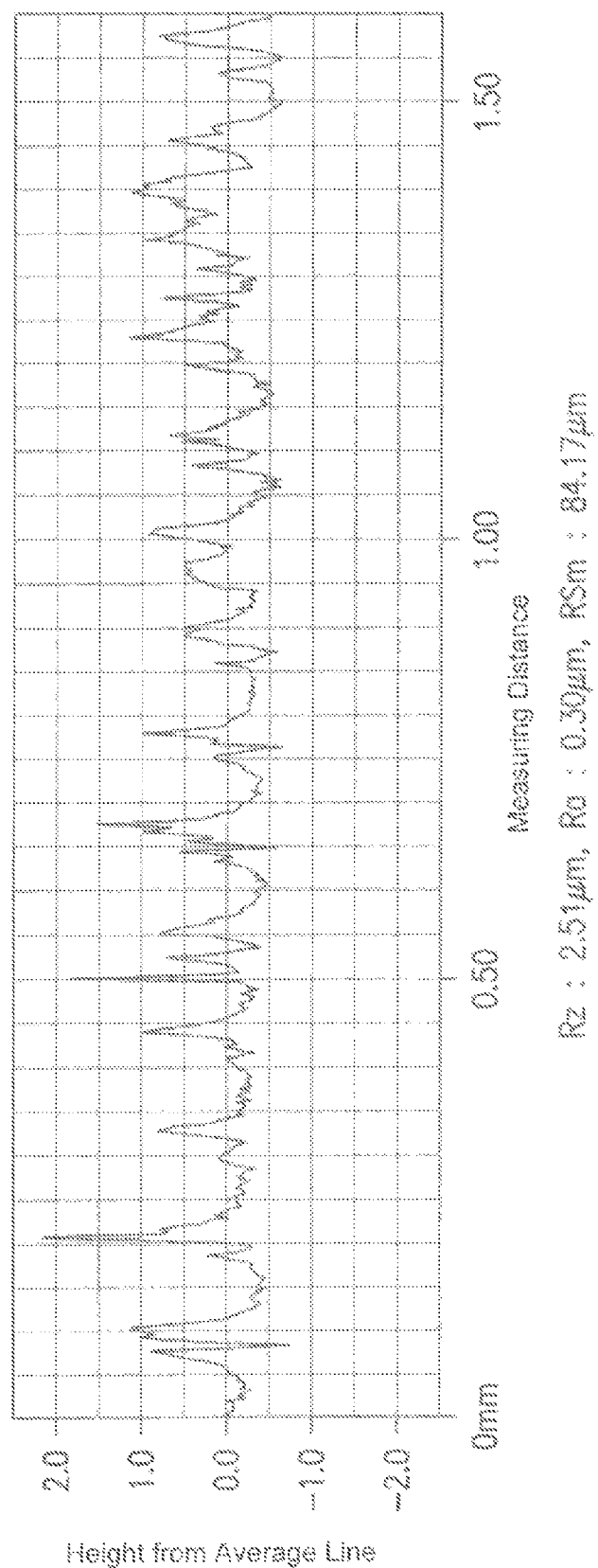

COPPER ALLOY AND ELECTRICALLY CONDUCTIVE MATERIAL FOR CONNECTING PARTS, AND MATING-TYPE CONNECTING PART AND METHOD FOR PRODUCING THE SAME

BACKGROUND OF THE INVENTION

1. Field of the Invention

The present invention relates to an electrically conductive material for connecting parts, such as a terminal for connectors or a bus bar used mainly for electrical wiring in automobiles, household equipment, and the like, and also to a mating-type connecting part and a method for producing the same. The present invention particularly relates to an electrically conductive material for connecting parts and a mating-type connecting part, which are expected to have both reduced friction or abrasion upon the insertion and extraction of male and female terminals and electrical connection reliability in use, and a method for producing the same.

2. Description of the Related Art

JP-B-3926355 describes an electrically conductive material for connecting parts, which has high electrical reliability (low contact resistance) and a low friction coefficient and is suitable as a terminal for a mating-type connector. According to the invention of JP-B-3926355, a copper-alloy plate strip having higher surface roughness than ordinary copper-alloy plate strips is used as a base material, and, on the surface of the base material, a Ni plating layer, a Cu plating layer, and a Sn plating layer are formed in this order, a Cu plating layer and a Sn plating layer are formed in this order, or only a Sn plating layer is formed. The Sn plating layer is reflowed so that a Cu—Sn alloy layer is formed from the Cu plating layer and the Sn plating layer or from the copper alloy base material and the Sn plating layer. At the same time, a portion of the Cu—Sn alloy layer is allowed to expose on the surface through the Sn plating layer smoothed by reflowing (a portion of the Cu—Sn alloy layer is exposed in the area of projections of the depressions and projections formed on the base material surface).

In JP-B-3926355, the electrically conductive material for connect parts formed after reflowing has, as a surface coating layer, a Cu—Sn alloy layer and a Sn layer, or alternatively a Ni layer, a Cu—Sn alloy layer, and a Sn layer, in this order. In some cases, a Cu layer remains between the base material surface and the Cu—Sn alloy layer or between the Ni layer and the Cu—Sn alloy layer. According to JP-B-3926355, the Cu—Sn alloy layer and the Sn layer are formed on the outermost surface (the Cu—Sn alloy layer exposure area ratio on the surface is 3 to 75%), the average thickness of the Cu—Sn alloy layer is 0.1 to 3.0 µm, the Cu content is 20 to 70 at %, and the Sn layer has an average thickness of 0.2 to 5.0 µm. It is also mentioned that the arithmetic mean roughness Ra of the base material surface is 0.15 µm or more at least in one direction, and is preferably 4.0 µm or less in every direction, and that the Cu—Sn alloy layer exposure interval on the surface is preferably 0.01 to 0.5 mm at lease in one direction.

JP-B-4024244 describes an electrically conductive material for connecting parts, which is the subordinate concept of JP-B-3926355, and a method for producing the same. The plating layer configuration and the coating layer configuration after reflowing themselves are the same as in JP-B-3926355. According to JP-B-4024244, in the electrically conductive material for connecting parts formed after reflowing, a Cu—Sn alloy layer and a Sn layer are formed on the outermost surface (of the surface coating layer, the Cu—Sn alloy layer exposure area ratio on the surface is 3 to 75%), the Cu—Sn alloy layer has an average thickness of 0.2 to 3.0 µm and a Cu content of 20 to 70 at %, the Sn layer has an average thickness of 0.2 to 5.0 µm, and the arithmetic mean roughness Ra of the base material surface is 0.15 µm or more at least in one direction and is 3.0 µm or less in every direction. It is also mentioned that the arithmetic mean roughness Ra of the base material surface is 0.3 µm or more at least in one direction, and is preferably 4.0 µm or less in every direction, and that the Cu—Sn alloy layer exposure interval on the surface is preferably 0.01 to 0.5 mm at lease in one direction.

JP-A-2007-258156 describes an electrically conductive material for connecting parts, which basically inherits the technical concepts of JP-B-3926355 and JP-B-4024244 and has improved solderability, and a method for producing the same. In the invention, the plating layer configuration and the coating layer configuration after reflowing themselves are basically the same as in JP-B-3926355 and JP-B-4024244. However, unlike JP-B-3926355 and JP-B-4024244, the invention may encompass the case where the Cu—Sn alloy layer is not exposed (only a Sn layer is present on the outermost surface). In this application, an electrically conductive material for connecting parts formed after reflowing is specified as follows. Of the surface coating layer, the Ni layer has an average thickness of 3.0 µm or less, the Cu—Sn alloy layer has an average thickness of 0.2 to 3.0 µm, the Sn layer has, in a vertical cross-section of the material, a minimum inscribed circle diameter (D1) of 0.2 µm or less and a maximum inscribed circle diameter (D2) of 1.2 to 20 µm, and the altitude difference (Y) between the outermost point of the material and the outermost point of the Cu—Sn alloy layer is 0.2 µm or less. JP-A-2007-258156 further mentions that it is preferable that when (D1) is 0 µm (when a portion of the Cu—Sn alloy layer is exposed, and the outermost surface is formed of the Cu—Sn alloy layer and the Sn layer), the Cu—Sn alloy layer has a maximum inscribed circle diameter (D3) of 150 µm or less on the material surface and/or the Sn layer has a maximum inscribed circle diameter (D4) of 300 µm or less on the material surface.

Meanwhile, JP-A-2004-300524, JP-A-2005-105307 and JP-A-2005-183298 state that a copper-alloy plate strip is stamped and then entirely plated with Sn, i.e., post-plated, so that a Sn plating layer is formed also on the stamped end face, thereby improving the solderability of a terminal or the like as compared with the case where a copper-alloy plate strip is plated with Sn prior to stamping (pre-plated).

Further, JP-A-2008-269999 and JP-A-2008-274364 mention that a post-plated terminal has improved electrical reliability (low contact resistance), a reduced friction coefficient at a mating portion, and also improved solderability at a soldering portion.

According to the invention of JP-A-2008-269999, a terminal is formed in such a manner that only a mating portion has increased surface roughness, and then a Ni plating layer, a Cu plating layer, and a Sn plating layer are formed in this order, a Cu plating layer and a Sn plating layer are formed in this order, or only a Sn plating layer is formed. The Sn plating layer is reflowed so that a Cu—Sn alloy layer is formed from the Cu plating layer and the Sn plating layer or from the copper alloy base material and the Sn plating layer. At the same time, a portion of the Cu—Sn alloy layer is allowed to expose on the surface through the Sn plating layer smoothed by reflowing (a portion of the Cu—Sn alloy layer is exposed in the area of projections of the depressions and projections formed on the base material surface). At this time, the plating thickness is the same over the entire surface. At the mating portion, the Cu—Sn alloy layer and the Sn layer are formed on the outermost surface (the Cu—Sn alloy layer is exposed on the surface), and, therefore, there is a problem in terms of solder wettability. However, at other portions than the mating portion, there are no depressions or projections. Therefore, no Cu—Sn alloy layer is exposed (only a Sn layer is present on the outermost surface), and solder wettability is thus excellent.

According to the invention of JP-A-2008-274364, a copper alloy material with high surface roughness is stamped into a terminal piece, and then a Ni plating layer, a Cu plating layer, and a Sn plating layer are formed in this order, a Cu plating layer and a Sn plating layer are formed in this order, or only a Sn plating layer is formed. The Sn plating layer is reflowed so that a Cu—Sn alloy layer is formed from the Cu plating layer and the Sn plating layer or from the copper alloy base material and the Sn plating layer. At the same time, a portion of the Cu—Sn alloy layer is allowed to expose on the surface through the Sn plating layer smoothed by reflowing (a portion of the Cu—Sn alloy layer is exposed in the area of projections of the depressions and projections formed on the base material surface). In this case, the Sn plating layer at the soldering portion is formed thick. As a result, the Cu—Sn alloy layer is not exposed on the surface at the soldering portion, leading to excellent solder wettability.

SUMMARY OF THE INVENTION

The electrically conductive materials for connecting parts described in JP-B-3926355, JP-B-4024244, JP-A-2007-258156, JP-A-2008-269999 and JP-A-2008-274364 have high electrical reliability (low contact resistance) and a low friction coefficient, and thus are suitable as terminals for mating-type connectors. However, strict requirements are imposed on the reduction of terminal insertion force due to the miniaturization or multipolarization of terminals, and there is a demand for provision of a material that can achieve a lower-insertion-force terminal corresponding to the miniaturization of terminals and also for further improvement of electrical reliability.

An object of the present invention is, in order to meet such demands, to further improve the techniques of the patent documents mentioned above, and provide an electrically conductive material for connecting parts, which achieves lower insertion force in response to the miniaturization of terminals and has improved electrical reliability.

Further, in the electrically conductive materials for connecting parts described in JP-B-3926355, JP-B-4024244, JP-A-2007-258156, JP-A-2008-269999 and JP-A-2008-274364, a surface-roughened copper sheet is used as a base material, and a Ni plating layer, a Cu plating layer, and a Sn plating layer, for example, are formed in this order on the surface thereof. Also, the Sn plating layer is reflowed to form a Cu—Sn alloy coating layer from the Cu plating layer and the Sn plating layer, and, at the same time, a portion of the Cu—Sn alloy coating layer is exposed on the surface through the Sn coating layer smoothed by reflowing.

As exposure indices of a Sn coating layer and a Cu—Sn coating layer, the exposure area ratio and average exposure interval of a Cu—Sn alloy coating layer (JP-B-3926355 and JP-B-4024244) and the maximum inscribed circle diameter and maximum circumscribed circle diameter of a Sn coating layer (JP-A-2007-258156) have been specified.

Meanwhile, no special attention has been paid to the shape of an individual Sn coating layer or Cu—Sn alloy coating layer. However, in order to deal with further miniaturization of terminals, in addition to the above indices, which are rather abstract, an appropriate and controllable plan-view shape will be neccessary for the specific shape of an individual Sn coating layer or Cu—Sn alloy coating layer.

Accordingly, the present invention is aimed to provide a mating-type connecting part that includes a Sn coating layer or Cu—Sn alloy coating layer with an appropriate and controllable plan-view shape and is capable of dealing with the miniaturization of terminals.

A copper sheet for connecting parts according to the present invention has a surface roughness defined by an arithmetic mean roughness Ra of 0.5 µm or more 4.0 µm or less in a direction parallel to a sliding direction upon connection, a mean projection-depression interval RSm of 0.01 mm or more and 0.3 mm or less in said direction, a skewness Rsk of less than 0, and a protrusion peak portion height Rpk of 1 µm or less. It is preferable that the copper sheet preferably has a protrusion valley portion depth Rvk of 2 µm or more and 15 µm or less in the direction parallel to the sliding direction. The copper sheet for connecting parts has a Cu—Sn alloy coating layer and a Sn or Sn alloy coating layer formed on the outermost surface thereof, and thereby serves as an electrically conductive material for connecting parts. The surface comes in slidable contact with a mating material.

The copper sheet (base material) for connecting parts has a Cu—Sn alloy coating layer and a Sn or Sn alloy coating layer (the two are collectively referred to as a Sn coating layer) formed on the outermost surface thereof as a surface coating layer. The specific configuration of the surface coating layer is not limited, but is preferably such that, for example, as described in JP-B-3926355, JP-B-4024244 and JP-A-2007-258156, the Cu—Sn alloy coating layer and the Sn coating layer are formed in this order, and a portion of the Cu—Sn alloy coating layer is exposed on the outermost surface. It is preferable that the Sn coating layer is smoothed by reflowing.

As a part of the surface coating layer of the copper sheet for connecting parts, a Ni coating layer may be formed between the surface of the copper sheet for connecting parts and the Cu—Sn alloy coating layer, and a Cu coating layer may be further formed between the Ni coating layer and the Cu—Sn alloy coating layer. Further, a Cu coating layer may be formed between the surface of the copper sheet for connecting parts and the Ni coating layer.

In the present invention, the copper sheet for connecting parts includes a copper or copper-alloy plate strip (plate and strip). The Sn coating layer, the Cu coating layer, and the Ni coating layer contain a Sn alloy, a Cu alloy, and a Ni alloy, respectively, in addition to the Sn, Cu, and Ni metals.

As described in JP-B-3926355, JP-B-4024244 and JP-A-2007-258156, the electrically conductive material for connecting parts can be produced by forming, on the surface of the base material formed of a copper sheet (having the above surface roughness), a Cu plating layer and a Sn or Sn alloy plating layer (the two are hereinafter collectively referred to as a Sn plating layer) in this order, followed by reflowing to form a Cu—Sn alloy coating layer and a Sn coating layer in this order.

The Cu—Sn alloy coating layer is formed by the interdiffusion of Cu and Sn of the Cu plating layer and the Sn plating layer caused by reflowing. At that time, the Cu plating layer may entirely disappear or partially remain. When the Cu plating layer partially remains, a Cu coating layer is formed between the surface of the copper sheet and the Cu—Sn alloy coating layer. Depending on the thickness of the Cu plating layer, Cu may also be supplied from the copper sheet (base material).

It is preferable that the Cu plating layer formed on the surface of the copper sheet (base material) has an average thickness of 1.5 µm or less, and the Sn plating layer has an average thickness within a range of 0.3 to 8.0 µm. The average thickness of the Cu plating layer is preferably 0.1 µm or more.

In the production method mentioned above, no Cu plating layer may be formed. In such a case, Cu for the Cu—Sn alloy coating layer is supplied from the copper sheet (base material).

In the production method mentioned above, a Ni plating layer may be formed between the surface of the copper sheet (base material) and the Cu plating layer. In such a case, it is preferable that the Ni plating layer has an average thickness of 3 µm or less, and the Cu plating layer has an average thickness of 0.1 to 1.5 µm. A further Cu plating layer may also be formed between the surface of the copper sheet (base material) and the Ni plating layer.

In the copper sheet (base material), the region to have the above surface roughness and form the surface coating layer may entirely cover one or both surfaces of the base material or may occupy only a portion of one or both surfaces.

In the present invention, the Cu plating layer, the Sn plating layer, and the Ni plating layer contain a Cu alloy, a Sn alloy, and a Ni alloy, respectively, in addition to the Cu, Sn, and Ni metals.

As used herein, a "coating layer" refers to each of the layers constituting a surface plating layer after reflowing, while a "plating layer" refers to each of the layers constituting a surface plating layer before reflowing.

A mating-type connecting part according to the present invention is obtained by post-plating and reflowing a copper sheet stamped into a predetermined shape, and includes a mixture of a Cu—Sn alloy coating layer and a Sn coating layer on an outermost surface thereof on the side that is in contact with a mating part. The Sn coating layer is smoothed by reflowing. The mating-type connecting part has the following characteristics:

(1) the Sn coating layer includes a Sn coating layer group observed as a plurality of parallel lines, the Cu—Sn alloy coating layer is present adjacent to each side of each of Sn coating layers constituting the Sn coating layer group, and the maximum height roughness Rz of the surface is 10 µm or less in the direction of part insertion; or (2) the Sn coating layer includes a Sn coating layer group observed as a plurality of parallel lines and one or more additional Sn coating layer groups each observed as a plurality of parallel lines, the Sn coating layer groups cross each other in a grid pattern, the Cu—Sn alloy coating layer is present adjacent to each side of each of Sn coating layers constituting each Sn coating layer group, and the maximum height roughness Rz of the surface is 10 µm or less in the direction of terminal insertion.

In the mating-type connecting part, it is preferable that the Sn coating layers of each Sn coating layer group have a width of 1 to 500 µm, and, of the Sn coating layers of each Sn coating layer group, the interval between adjacent Sn coating layers is 1 to 2000 µm.

As mentioned above, the Sn coating layers of each Sn coating layer group are individually observed as a plurality of parallel lines on the outermost surface on the side that is contact with a mating part (sliding side). However, such Sn coating layers do not necessarily have to be in the form of mathematically parallel lines. Even when the Sn coating layers of each Sn coating layer group are individually curvy, wavy, or winding in practically the same form, such a case is also encompassed by the present invention.

The mating-type connecting part has a Cu—Sn alloy coating layer and a Sn coating layer formed on the outermost surface thereof as a surface coating layer of the copper sheet (base material). The specific configuration of the surface coating layer formed of the Cu—Sn alloy coating layer and the Sn coating layer may be such that, for example, as described in JP-B-3926355, JP-B-4024244 and JP-A-2007-258156, the Cu—Sn alloy coating layer and the Sn coating layer are formed in this order, and a portion of the Cu—Sn alloy coating layer is exposed on the outermost surface through the Sn coating layer smoothed by reflowing. In this case, the Cu—Sn alloy coating layer exposed on the outermost surface is measured as a peak of a roughness curve, and such a peak is reflected by the magnitude of maximum height roughness Rz.

When the Cu—Sn alloy coating layer and the Sn coating layer are formed in this order, it is preferable that the Cu—Sn alloy coating layer has an average thickness of 0.1 to 3 µm, and the Sn coating layer has an average thickness of 0.2 to 5.0 µm. Such average thicknesses of coating layers are on the same level as those of related art (JP-B-3926355, JP-B-4024244 and JP-A-2007-258156).

As a part of the surface coating layer of the mating-type connecting part, a Ni coating layer may be formed between the surface of the copper sheet (base material) and the Cu—Sn alloy coating layer, and a Cu coating layer may be further formed between the Ni coating layer and the Cu—Sn alloy coating layer. A Cu coating layer may further be formed between the surface of the copper sheet for connecting parts and the Ni coating layer.

The present invention provides an electrically conductive material for connecting parts, which achieves low insertion force in response to the miniaturization of terminals and has excellent electrical reliability.

The present invention also provides a mating-type connecting part that achieves low insertion force and has excellent electrical reliability.

The plan-view shapes of the Sn coating layer and the Cu—Sn alloy coating layer specified by the present invention are compatible with the miniaturization of terminals. Further, the plan-view shapes can be easily controlled by suitably roughening the surface of the copper sheet.

BRIEF DESCRIPTION OF THE DRAWINGS

FIG. 13A is a surface SEM (composition image) and FIG. 13B is a roughness curve of a specimen No. 101 in the Examples.

DESCRIPTION OF THE PREFERRED EMBODIMENTS

Hereinafter, an electrically conductive material for connecting parts according to the present invention will be described in detail.

Generally, in consideration of electrical reliability, corrosion resistance, etc., an electrically conductive material for connecting parts is plated with Sn or a Sn alloy. A conventionally used Sn plating layer applied to an electrically conductive material for connecting parts has an average thickness of about 1 μm. In the case of Sn plating on a copper base material, a Cu—Sn alloy coating layer is formed at the interface between the Sn plating and the copper of the base material, and, therefore, the remaining Sn plating layer (Sn coating layer) has a thickness of about 0.4 μm. When the Sn coating layer has a thickness of less than 0.4 μm, this leads to a decrease in heat-resistance reliability (electrical characteristics) and corrosion resistance. Meanwhile, when the Sn coating layer has a larger thickness, this leads to an increase in insertion force upon terminal connection, decreasing workability.

For the purpose of reducing such terminal insertion force, the electrically conductive material for connecting parts according to the present invention has a hard Cu—Sn alloy coating layer exposed on the outermost surface thereof. That is, a Cu—Sn alloy coating layer and a Sn coating layer are present on the outermost surface.

The copper sheet material, which is a plating base material for the electrically conductive material for connecting parts, has the specific surface roughness mentioned above. Unless otherwise noted, the surface roughness is a parameter defined by JIS B0601 or JIS B0671.

Figure 1:
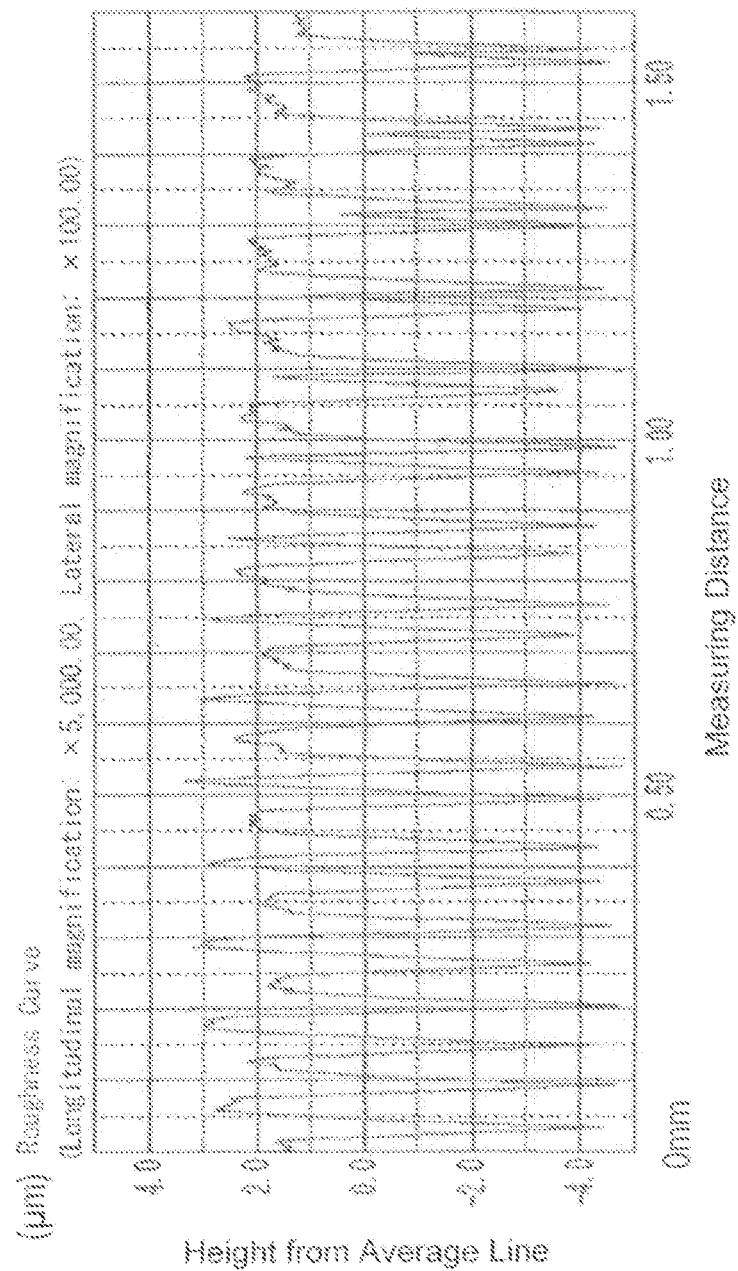
FIG. 1 is a roughness curve (JIS B0601) of No. 1 in Examples.

The following describes the reason why the arithmetic mean roughness Ra should be 0.5 μm or more and 4.0 μm or less in the direction parallel to the sliding direction upon connection. The arithmetic mean roughness Ra is a value obtained by sampling a reference length L from a roughness curve in the direction of its mean line, summing the absolute values of deviations of the sampled portion from the mean line to the measured curve, and averaging the sum and is less likely to be affected by peculiar parts such as cracks and foreign matters, and thus the obtained numerical value is stable. Generally, the magnitude of surface roughness is represented by the magnitude of the value of arithmetic mean roughness Ra. JP-B-3926355 and JP-B-4024244 also use arithmetic mean roughness Ra to specify surface roughness. The direction parallel to the sliding direction upon connection refers to, in the case of a mating-type terminal, the direction in which a terminal is inserted. FIG. 1 shows one of roughness curves obtained in Examples (according to JIS B0601).

When the arithmetic mean roughness Ra is less than 0.5 μm in the direction parallel to the sliding direction upon connection, the surface of the base material has small projections and depressions. Accordingly, in the case where the Sn coating layer has a thickness of more than 0.4 μm, when the skewness Rsk is less than 0 in the above direction, the Cu—Sn alloy coating layer is not exposed on the outermost surface, and this results in a friction coefficient of more than 0.4 as measured by the measurement method mentioned below. In the case where the arithmetic mean roughness Ra is 0.5 μm or more in the above direction, even when the Sn coating layer has a thickness of more than 0.4 μm and is as thick as 0.7 μm, a friction coefficient of 0.4 or less can be ensured. Meanwhile, when the arithmetic mean roughness Ra is more than 4.0 μm, this makes it difficult to smooth the material surface by the flowing action of the molten Sn or Sn alloy plating during reflowing. Therefore, the arithmetic mean roughness Ra should be 0.5 μm or more and 4.0 μm or less in the above direction. It is preferable that the arithmetic mean roughness Ra is 4.0 μm or less in every direction.

The following describes the reason why the mean projection-depression interval RSm in the direction parallel to the sliding direction upon connection should be 0.01 to 0.3 mm. Mean projection-depression interval RSm is a value obtained by sampling a reference length L from a roughness curve in the direction of its mean line, calculating the total length of the mean lines each corresponding to one peak and one valley adjoining thereto, and expressing the average thereof in millimeters. The value of mean projection-depression interval RSm can be calculated from the roughness curve from which the arithmetic mean roughness Ra is calculated. The mean projection-depression interval RSm of the surface of the copper sheet is a value that directly reflects the exposure intervals of the Cu—Sn alloy coating layer. When RSm is less than 0.01 mm, the exposure intervals of the Cu—Sn alloy coating layer are narrow. As a result, the oxidation of Cu is promoted in high-temperature environments, causing an increase in contact resistance. When the mean projection-depression interval RSm is more than 0.3 mm, the exposure intervals of the Cu—Sn alloy coating layer are wide, causing an increased friction coefficient in a small-sized terminal with a small electrical contact portion. In the case where a terminal is small-sized, the contact portion accordingly has a small contact area. When the exposure intervals of the Cu—Sn alloy coating layer are wide, contact occurs at the Sn coating layer zones therebetween. Therefore, the zone of contact undergoes sliding between Sn and Sn to cause adhesion, increasing the friction coefficient. Therefore, the mean projection-depression interval RSm should be 0.01 or more and 0.3 mm or less.

Figure 2:
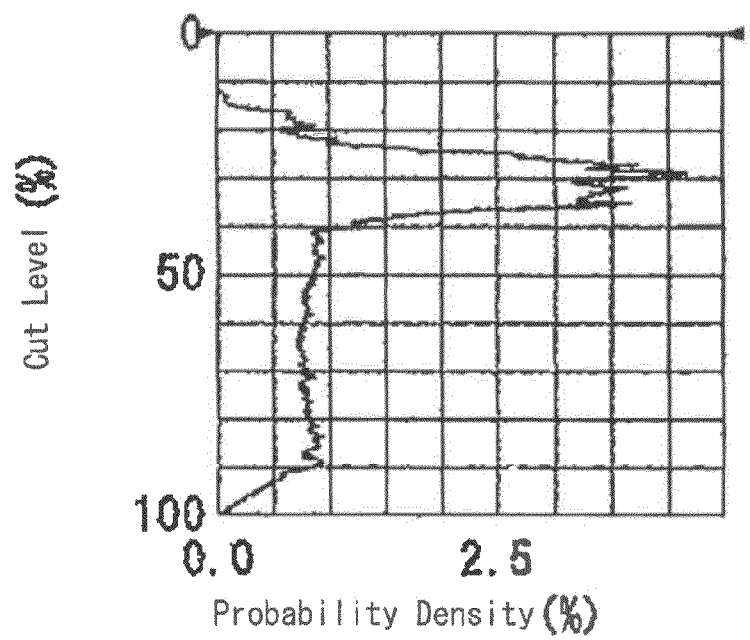
FIG. 2 is an amplitude curve calculated from the roughness curve of FIG. 1.

The following describes the reason why the skewness Rsk should be less than 0 in the above direction. Skewness Rsk is a value that represents the relativity of an amplitude curve calculated from a roughness curve to its mean line. The value of skewness Rsk can be calculated from the roughness curve from which the arithmetic mean roughness Ra is calculated. An amplitude curve shows, on a graph, all cut levels in a roughness curve together with the probability that the roughness curve equals the cut levels. Rsk<0 when the probability is biased above the mean line, Rsk>0 when it is biased below the mean line, and Rsk=0 when it matches the mean line. In the case where the arithmetic mean roughness Ra and the mean projection-depression interval RSm are within the ranges specified above, when Rsk is not less than 0 (Rsk≥0), the zone of depressions increase, leading to an increase in the area of the Sn coating layer. That is, the zone of contact undergoes sliding between Sn and Sn, increasing the friction coefficient. Therefore, the skewness Rsk should be less than 0 (Rsk<0). A range where Rsk≥−3.00 can be easily achieved by the surface-roughening method mentioned below. FIG. 2 shows an amplitude curve calculated from the roughness curve of FIG. 1. In this example, the probability is higher above the mean line (in a position at a cut level of 50%).

Figure 3:
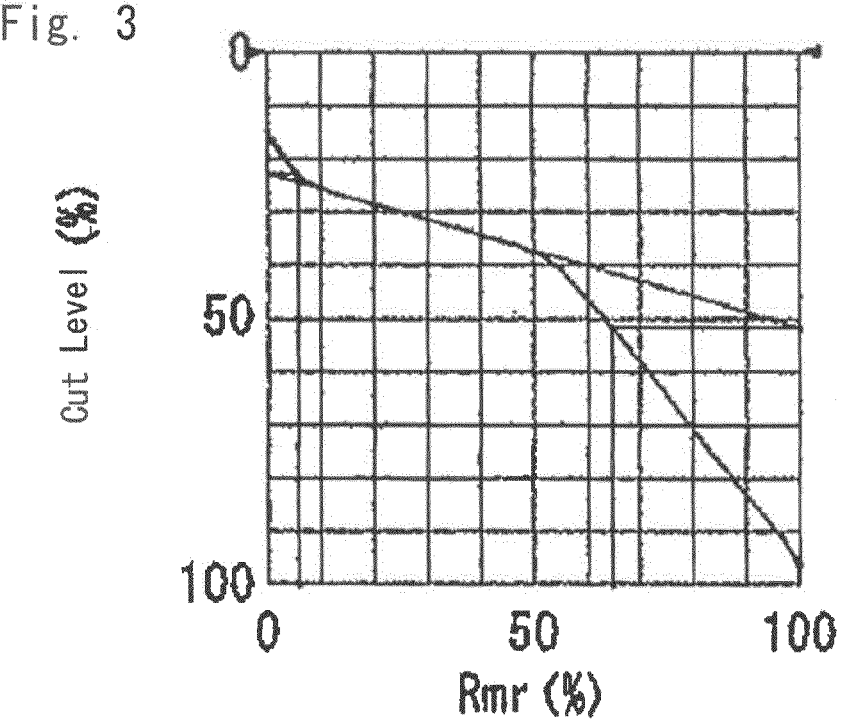
FIG. 3 is a load curve calculated from the roughness curve (JIS B0671-1) of FIG. 1.

The following describes the reason why the protrusion peak portion height Rpk should be 1 μm or less in the above direction. Protrusion peak portion height Rpk is specified by JIS B0671-2. This is a value that represents the mean height of protrusion peak portions located on the core sections in a roughness curve, and is determined from a load curve calculated from the roughness curve specified by JIS B0671-1. Rpk can be determined from a load curve calculated from the roughness curve from which the arithmetic mean roughness Ra is determined (however, the processing should follow JIS B0671-1). Such a protrusion peak portion is a peak portion that further protrudes from a peak for defining RSm. With reference to FIG. 1, protrusion peak portions are finely formed on the roughness curve peaks themselves, so the intervals between the protrusion peak portions are smaller than RSm, the mean interval of peaks (valleys). After Sn plating by reflowing process, a Cu—Sn alloy coating layer is formed in such an area, resulting in a reduced friction coefficient. However, when the protrusion peak portion height Rpk is more than 1 μm, the height of the Cu—Sn alloy coating layer protruding from the material surface is increased. Such a protruding Cu—Sn alloy coating layer shaves the Sn coating layer on the embossed surface, and this leads to an increase in insertion force. Therefore, the protrusion peak portion height Rpk should be 1 μm or less. Rpk is preferably 0.3 μm or more and 1 μm or less; in such a case, even when the female terminal has an emboss diameter as small as 1.0 mm and the Sn coating layer has a thickness as large as 0.7 μm, a friction coefficient of 0.4 or less as measured by the measurement method mentioned below can be achieved. FIG. 3 shows a load curve calculated from the roughness curve shown in FIG. 1.

The following describes the reason why the protrusion valley portion depth Rvk should be 2 to 15 μm in the above direction. Protrusion valley portion depth Rvk is specified by JIS B0671-2. This is a value that represents the mean depth of protrusion valley portions located under the core sections in a roughness curve, and is determined from a load curve calculated from the roughness curve. Rvk can be determined from the load curve from which the protrusion peak portion height Rpk is determined. When the mean depth of protrusion valley portions is large, molten Sn flows thereinto during reflowing. Accordingly, with the Cu—Sn alloy layer being exposed on the surface, the average thickness of the Sn coating layer can be increased. That is, in the case where the arithmetic mean roughness Ra, mean projection-depression interval RSm, skewness Rsk, and protrusion peak portion height Rpk are within the ranges specified above, and the protrusion valley portion depth Rvk is 2 or more, even when the Sn coating layer is as thick as 1.0 μm, a friction coefficient of 0.4 or less can be achieved. Meanwhile, when the protrusion valley portion depth Rvk is set at more than 15 μm by the surface-roughening method mentioned below, this is likely to cause bending or deformation of the copper sheet. Therefore, the protrusion valley portion depth Rvk should be 2 to 15 μm.

For the measurement of the surface roughness of the copper sheet, the parameters may be determined as follows. On the surface of the copper sheet, a region with a width corresponding to a terminal is suitably selected, and, within such a region, measurements are made at several points along the direction parallel to the sliding direction upon connection. Based on the roughness curve that provides the maximum arithmetic mean roughness Ra, each surface roughness parameter may be determined.

As a surface film layer formed on the material surface, the surface film layer structure described in JP-B-3926355 and JP-B-4024244 may be applied. That is, a Cu—Sn alloy coating layer with a Cu content of 20 to 70 at % and an average thickness of 0.2 to 3.0 μm and a Sn coating layer with an average thickness of 0.2 to 5.0 μm are formed in this order, and a portion of the Cu—Sn alloy coating layer is exposed on the surface of the Sn coating layer, with the exposure ratio on the material surface being 3 to 75%. Further, a Ni coating layer and a Cu layer may be formed between the Cu—Sn alloy coating layer and the base material.

As surface-roughening methods, JP-B-3926355 and JP-B-4024244 mention physical methods such as ion etching, chemical methods such as etching and electrolytic polishing, and mechanical methods such as rolling (using a work roll with a surface roughened by polishing, shot-blasting, etc.), polishing, and shot-blasting. It is also mentioned that rolling and polishing are preferred as methods that are advantageous in productivity, economical efficiency, and the surface configuration reproducibility of the base material. When the base material is surface-roughened by rolling, rolling is performed using a work roll with a roughened surface to transfer the surface configuration of the work roll. However, in reality, by such a method, it was difficult to achieve the surface roughness specified by the present invention because of the following reasons. In the case of rolling, for example, in order to form deep depressions and projections uniformly over the entire surface of the work roll surface at fine intervals, high cost is required. There also are problems of abrasion of the roll, clogging, and the like. Accordingly, it is difficult to transfer the depression-projection shape corresponding to the surface roughness specified by the present invention (deep grooves formed at fine intervals) uniformly onto the entire surface of the copper sheet.

Figure 4:
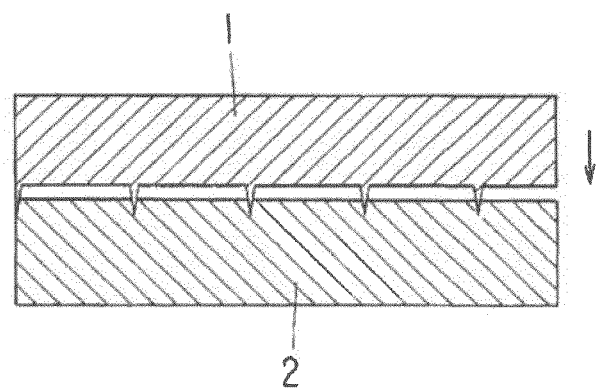
FIG. 4 is a schematic diagram showing an example of a surface-roughening method for obtaining the surface roughness specified by the present invention.

Meanwhile, JP-A-2008-269999 and JP-A-2008-274364 describe a technique of performing surface roughening at the time of the formation of a terminal shape. That is, a copper sheet is stamped to form a copper sheet including terminal pieces connected in chains in the lengthwise direction via strip-like connecting portions. Also, at the same time as stamping or at an earlier or later time, the copper sheet is pressed to increase the surface roughness of the terminal piece plate surface (surface of the copper sheet). JP-A-2008-269999 or JP-A-2008-274364 nowhere describes a specific pressing process. However, for example, as shown in FIG. 4, a die 1 having extremely fine depressions and projections formed on the pressing surface thereof with constant pitch is mounted on a pressing machine, and then the surface of a copper sheet 2 is pressed with the die 1 so that the depression-projection shape of the pressing surface is transferred onto the surface of the copper sheet 2 (projections (blade edges) cut deeply thereinto); in this manner, the surface of the copper sheet can be provided with the surface roughness specified by the present invention. The method for forming fine depressions and projections on the pressing surface of the die 1 may be electrical discharging, grinding, laser processing, or the like, and any of them can be selected according to the desired dimensional accuracy and processing shape.

Figure 6:
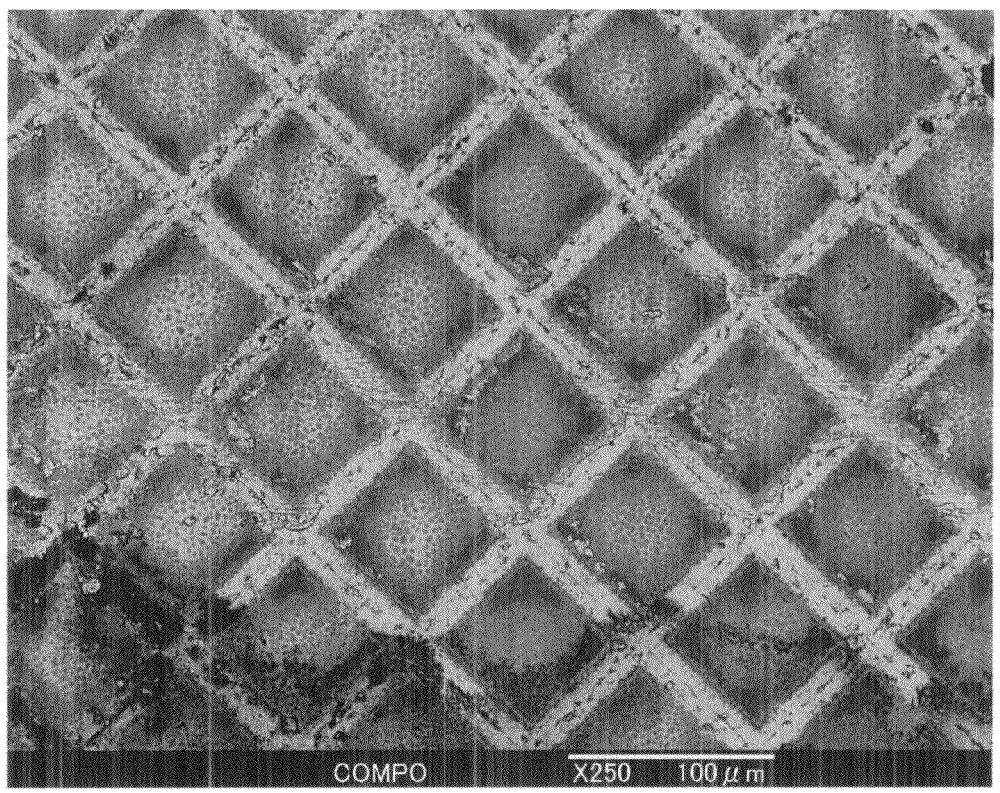
FIG. 6 is a surface SEM (composition image) of a specimen No. 1 in the Examples.

When the projections on the pressing surface of the die are formed in the form of parallel lines, for example, fine grooves (valleys of a roughness curve) can be formed in the form of parallel lines deep in the surface of the copper sheet by the surface-roughening method. Further, as described below in the Example, grooves may also be formed in a grid pattern where grooves in the form of parallel lines cross each other. Upon reflowing, molten Sn flows into the grooves and solidifies to form a Sn coating layer in the form of parallel lines as shown in FIG. 6. When grooves are formed in the form of parallel lines by surface roughening in this manner, it is preferable that the direction of grooves does not match the direction of terminal insertion (the direction of grooves and the direction of terminal insertion cross each other). In the case where such grooves are formed in the surface of the copper sheet, the arithmetic mean roughness Ra of the copper sheet increases when the measurement direction and the grooves cross each other. The mean roughness Ra does not greatly change with the crossing angle.

Hereinafter, the mating-type connecting part according to the present invention will be described in detail.

The mating-type connecting part according to the present invention is obtained by post-plating and reflowing a copper sheet stamped into a predetermined shape and includes a mixture of a Cu—Sn alloy coating layer and a Sn coating layer on an outermost surface thereof on the side that is contact with a mating part. The Sn coating layer is smoothed by reflowing. More specifically, the surface coating layer formed of the Cu—Sn alloy coating layer and the Sn coating layer is configured such that the Cu—Sn alloy coating layer and the Sn coating layer are formed in this order on the surface of a copper sheet (base material), and a portion of the Cu—Sn alloy coating layer is exposed on the outermost surface through the Sn coating layer smoothed by reflowing. When the hard Cu—Sn alloy coating layer is exposed on the outermost surface on the side that is contact with a mating part (sliding side), the terminal insertion force is reduced.

The Cu—Sn alloy coating layer exposed on the outermost surface is measured as a peak of a roughness curve according to JIS B0601, and such a peak is reflected by the magnitude of maximum height roughness Rz.

In the mating-type connecting part according to the present invention, the Sn coating layer and the Cu—Sn alloy coating layer present on the outermost surface on the side that is contact with a mating part are configured as the following (1) or (2):

(1) a Sn coating layer group observed as a plurality of parallel lines is included, and the Cu—Sn alloy coating layer is present adjacent to each side of each of Sn coating layers constituting the Sn coating layer group (these Sn coating layers are sometimes particularly referred to as parallel Sn coating layers); or (2) a Sn coating layer group observed as a plurality of parallel lines and one or more additional Sn coating layer groups each observed as a plurality of parallel lines are included, the Sn coating layer groups cross each other in a grid pattern, and the Cu—Sn alloy coating layer is present adjacent to each side of each of Sn coating layers constituting each Sn coating layer group (these Sn coating layers are sometimes particularly referred to as parallel Sn coating layers).

The configurations (1) and (2) of the parallel Sn coating layers and the Cu—Sn alloy coating layer will be described with reference to the schematic diagrams of FIGS. 8A, 8B, 9A, and 9B. FIGS. 8A, 8B, 9A, and 9B each show a schematic plan view of a portion of the outermost surface of a mating-type connecting part taken in a substantially square shape.

Figure 8A:
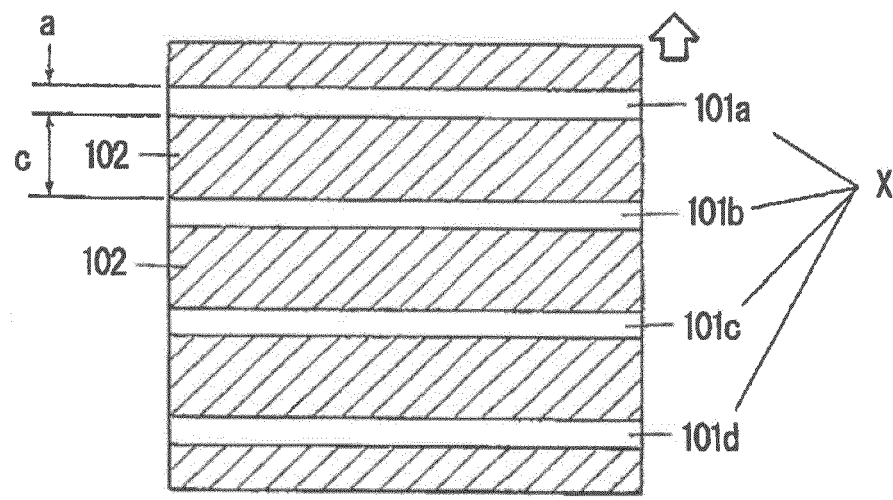
FIGS. 8A and 8B are schematic plan views each illustrating the configuration of the surface coating layer of a mating-type connecting part according to the present invention.
Figure 8B:
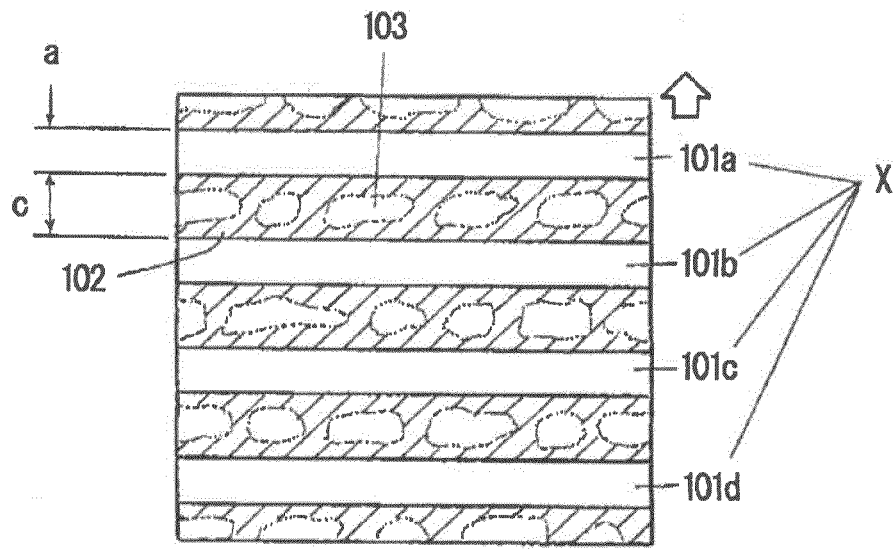

First, FIGS. 8A and 8B show typical examples of the configuration (1). In the example shown in FIG. 8A, a plurality of parallel Sn coating layers 101a to 101d (sometimes collectively referred to as parallel Sn coating layers 101) having a predetermined width are formed in the form of parallel lines at substantially regular intervals, and a Cu—Sn alloy coating layer 102 is present adjacent to each side of each of the parallel Sn coating layers 101a to 101d. The Cu—Sn alloy coating layer 102 has a predetermined width and is also formed in the form of parallel lines at substantially regular intervals. The plurality of parallel Sn coating layers 101a to 101d formed in the form of parallel lines constitute a Sn coating layer group X as defined herein.

In the example shown in FIG. 8B, a plurality of parallel Sn coating layers 101a to 101d having a predetermined width are formed in the form of parallel lines at substantially regular intervals, and a Cu—Sn alloy coating layer 102 is present adjacent to each side thereof. Although the Cu—Sn alloy coating layer 102 has a predetermined width and is also formed in the form of parallel lines at substantially regular intervals, this example is different from the example of FIG. 8A in that a Sn coating layer 103 is present in the form of islands in the Cu—Sn alloy coating layer 102. The plurality of parallel Sn coating layers 101 formed in the form of parallel lines constitute a Sn coating layer group X as defined herein.

In FIG. 8B, various other configurations are possible. For example, the Sn coating layers 103 in the form of island may be continuous to divide the Cu—Sn alloy coating layer 102, or a further Cu—Sn alloy coating layers may be present in the form of small islands in the Sn coating layer 103.

Figure 9A:
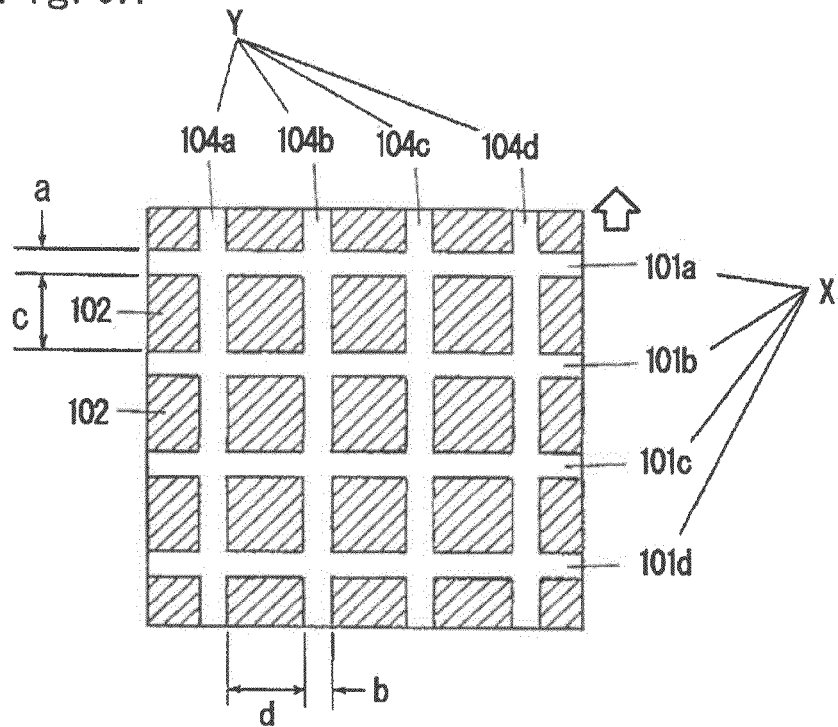
FIGS. 9A and 9B are other schematic plan views each illustrating the configuration of the surface coating layer of a mating-type connecting part according to the present invention.
Figure 9B:
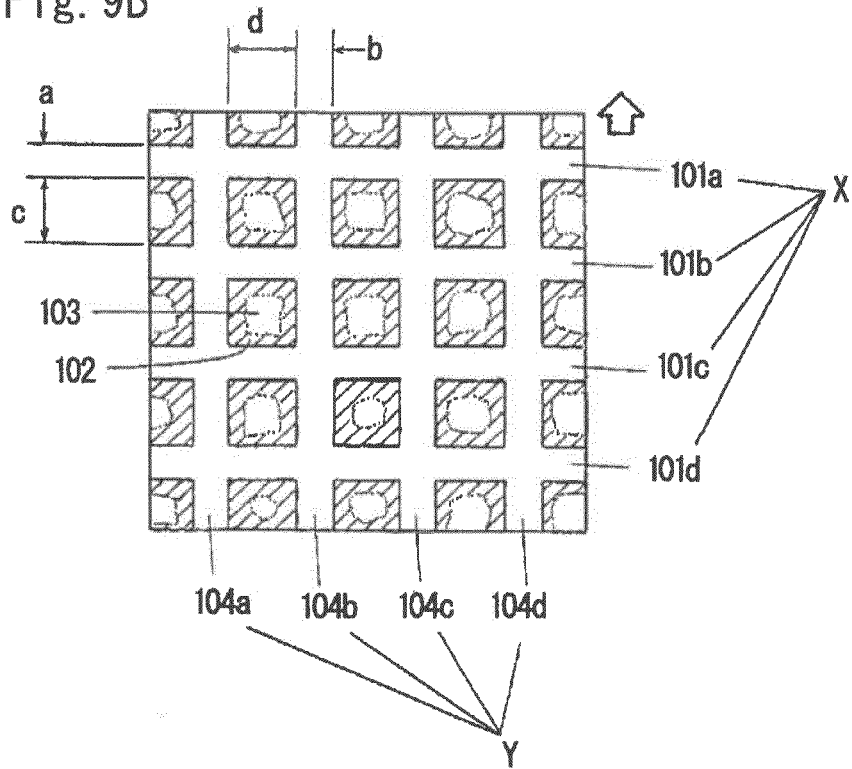

FIGS. 9A and 9B show typical examples of the configuration (2). In the example shown in FIG. 9A, a plurality of parallel Sn coating layers 101a to 101d having a predetermined width are formed in the form of parallel lines at substantially regular intervals. Further, at right angles thereto, a plurality of parallel Sn coating layers 104a to 104d (sometimes collectively referred to as parallel Sn coating layers 104) having a predetermined width are formed in the form of parallel lines at substantially regular intervals. The plurality of parallel Sn coating layers 101a to 101d formed in the form of parallel lines constitute a Sn coating layer group X as defined herein, and the plurality of parallel Sn coating layers 104a to 104d formed in the form of parallel lines constitute a Sn coating layer group Y as defined herein. The two Sn coating layer groups X and Y cross each other in a grid pattern, and the Cu—Sn alloy coating layer 102 is present in each area defined by the grid. Also in this case, it can be said that the Cu—Sn alloy coating layer 102 is present adjacent to each side of each of the parallel Sn coating layers 101 and 104.

In the example shown in FIG. 9b, a plurality of parallel Sn coating layers 101a to 101d having a predetermined width are formed in the form of parallel lines at substantially regular intervals. Further, at right angles thereto, a plurality of parallel Sn coating layers 104a to 104d having a predetermined width are formed in the form of parallel lines at substantially regular intervals. The plurality of parallel Sn coating layers 101a to 101d formed in the form of parallel lines constitute a Sn coating layer group X as defined herein, and the plurality of parallel Sn coating layers 104a to 104d formed in the form of parallel lines constitute a Sn coating layer group Y as defined herein. The two Sn coating layer groups X and Y cross each other in a grid pattern, and the Cu—Sn alloy coating layer 102 is present in each area defined by the grid. This example is different from the example of FIG. 9A in that a Sn coating layer 103 is present in the form of islands in the Cu—Sn alloy coating layer 102. Also in this case, it can be said that the Cu—Sn alloy coating layer 102 is present adjacent to each side of each of the parallel Sn coating layers 101 and 104.

In addition, various other configurations are possible. For example, in FIG. 9B, a further Cu—Sn alloy coating layer may be present in the form of small islands in the Sn coating layer 103 formed in islands.

In the mating-type connecting part shown in FIG. 8A, 8B, 9A, or 9B, the Cu—Sn alloy coating layer 102 exposed on the surface protrudes in the height direction from the level of the parallel Sn coating layers 101 (as well as the Sn coating layer 103 and the parallel Sn coating layers 104) smoothed by reflowing. Cross-sectional configurations of such coating layers will be described with reference to the schematic cross-sectional views of FIGS. 10A and 10B.

Figure 10A:
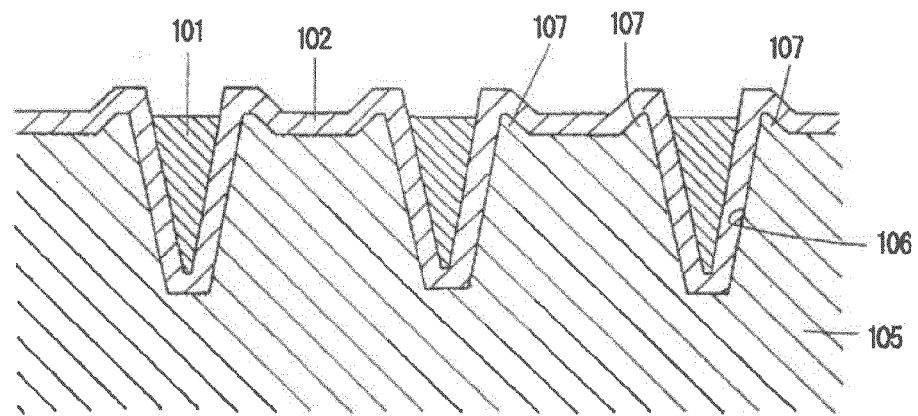
FIGS. 10A and 10B are schematic cross-sectional views each illustrating the configuration of the surface coating layer of a mating-type connecting part according to the present invention.
Figure 10B:
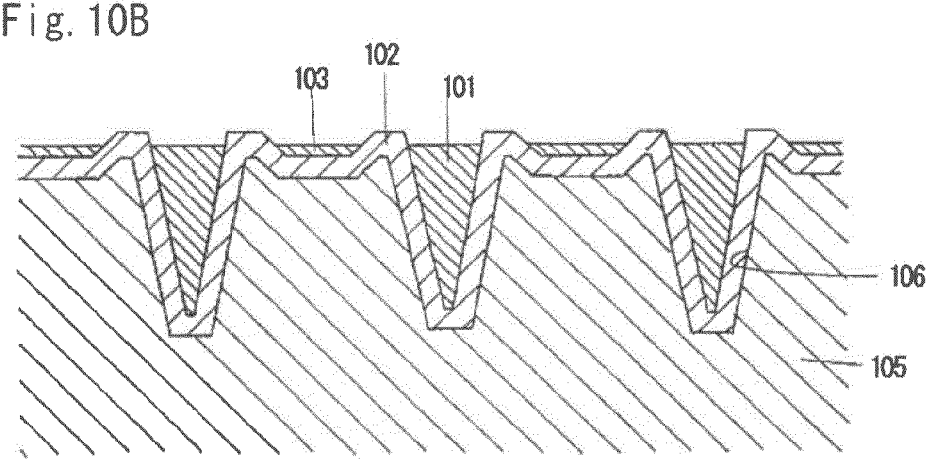

In FIGS. 10A and 10B, relatively deep depressions 106 are formed in the copper sheet (base material) 105 at substantially regular intervals, and a projection 107 is formed on each side of each depression 106. The region between adjacent projections 107,107 with no depression 106 therebetween is relatively flat. Such a surface structure is called a plateau structure. The depressions 106 are observed as a plurality of parallel lines in the surface of the copper sheet 105.

FIG. 10A corresponds to FIG. 8A (or FIG. 9A). A Cu—Sn alloy coating layer 102 is formed over the entire surface of the copper sheet 105. In the depressions 106, parallel Sn coating layers 101 are formed on the Cu—Sn alloy coating layer 102. The parallel Sn coating layers 101 formed in the depressions 106 are equivalent to the parallel Sn coating layers 101a to 101d (or the parallel Sn coating layers 104a to 104d) observed in the form of parallel lines in FIG. 8A or FIG. 9A.

FIG. 10B corresponds to FIG. 8B (or FIG. 9B). A Cu—Sn alloy coating layer 102 is formed over the entire surface of the copper sheet 105. In the depressions 106, parallel Sn coating layers 101 are formed on the Cu—Sn alloy coating layer 102. Also in a plateau region, a Sn coating layer 103 is formed on the Cu—Sn alloy coating layer 102. The parallel Sn coating layers 101 formed in the depressions 106 are equivalent to the parallel Sn coating layers 101a to 101d (or the parallel Sn coating layers 104a to 104d) observed in the form of parallel lines in FIG. 8B or FIG. 9B, and the Sn coating layer 103 formed in the plateau region is equivalent to the Sn coating layer 103 observed in the form of islands in FIG. 8B or FIG. 9B.

With respect to the configuration of the surface coating layer including the Cu—Sn alloy coating layer 102 and the parallel Sn coating layers 101 (and the parallel Sn coating layers 104), a specific example of its formation process will be described.

Figure 11A:
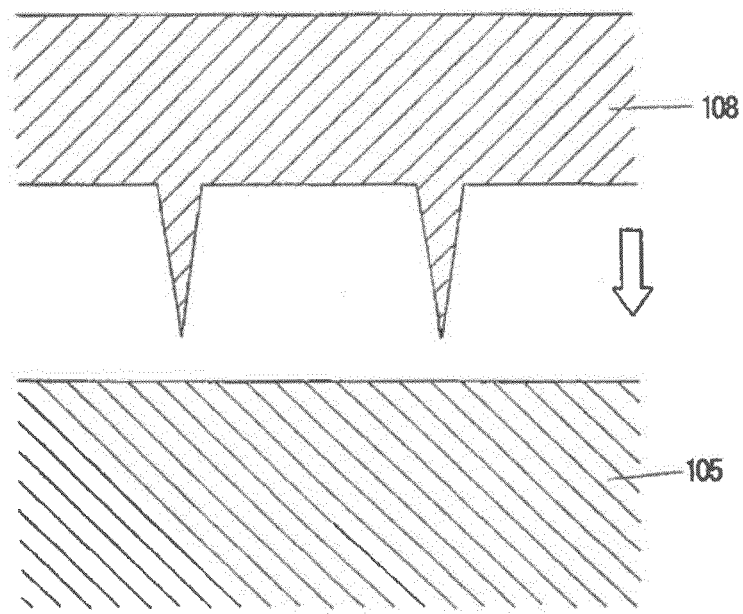
FIGS. 11A and 11B are schematic cross-sectional views each illustrating the surface roughening of a copper sheet in use for a mating-type connecting part according to the present invention.

After, before, or at the same time as stamping into a part shape, the copper sheet 105 is subjected to a surface-roughening process by pressing. The surface roughening process is performed as follows. As shown in FIG. 11A, a die 108 with extremely fine depressions and projections formed on the pressing surface thereof at approximately constant pitch is mounted on a pressing machine, and the die 108 is pressed against the surface of the copper sheet 105. By such pressing, the projections (blade edges) on the pressing surface of the die 108 are pressed into the surface of the copper sheet 105, and the shape of the depressions 106 is transferred to the surface of the copper sheet 105 in the form of parallel lines. At the same time, the material pushed out by the depressions 106 rises on both sides of each depression 106, naturally forming projections 107. With respect to the copper sheet surface between the adjacent projections 107,107 with no depression 106 therebetween, the region remains relatively flat (plateau) as shaped by finish rolling.

Subsequently, in the same manner as in JP-B-3926355, JP-B-4024244 and JP-A-2007-258156, etc., the surface of the copper sheet 105 stamped into a part shape is plated with Cu and Sn, for example, and then is further subjected to a reflowing process. By the reflowing process, a Cu—Sn alloy coating layer is formed from Cu of the Cu plating layer and Sn of the Sn plating layer, and molten Sn flows into the depressions 106, etc. As a result, as shown in FIG. 10A, smoothed parallel Sn coating layers 101 are formed on the Cu—Sn alloy coating layer 102, and portions of the Cu—Sn alloy coating layer 102 are exposed adjacent to the parallel Sn coating layers 101 on both sides of the parallel Sn coating layers 101. At this time, a portion of the Cu plating layer may remain under the Cu—Sn alloy coating layer 102.

As used herein, a "coating layer" refers to each of the layers constituting a surface coating layer after reflowing, while a "plating layer" refers to each of the layers constituting a surface plating layer before reflowing.

When the amount of Sn remaining after reflowing is relatively large, the Sn coating layer 103 is formed on a part of the plateau region of the copper alloy plate surface (see FIG. 8B, FIG. 9B, and FIG. 10B) or the area covered with the Sn coating layer 103 is increased. As shown in FIG. 10B, the Sn coating layer 103 is thinner than the parallel Sn coating layers 101.

The parallel Sn coating layers 101 constituting the Sn coating layer group X and the parallel Sn coating layers 104 constituting the Sn coating layer group Y are configured such that the widths a and b (see FIGS. 8A, 8B, 9A, and 9B) are each 1 to 500 μm, and the intervals c and d between adjacent parallel Sn coating layers (see FIGS. 8A, 8B, 9A, and 9B) are each 1 to 2000 μm. The reason why the width of each parallel Sn coating layer and the interval between adjacent parallel Sn coating layers should be as above is that within the ranges, the parallel Sn coating layers and the Cu—Sn alloy coating layer are moderately mixed on the outermost surface, whereby both reduced insertion force due to a low friction coefficient and electrical reliability can be ensured.

More specifically, the reason why the parallel Sn coating layers should have a width of 1 μm or more is that when the parallel Sn coating layers have a smaller width, this makes it difficult to perform surface roughening process of the copper sheet. Meanwhile, when the width of the parallel Sn coating layers is too large, the contact portion of the mating terminal breaks into the parallel Sn coating layers, thereby increasing insertion force. Therefore, the parallel Sn coating layers should have a width of 500 μm or less. In light of the recent miniaturization of terminals, the parallel Sn coating layers preferably have a width of 200 μm or less, and more preferably 50 μm or less.

The reason why the interval between adjacent parallel Sn coating layers should be 1 μm or more is that this makes it difficult to perform surface roughening of the copper sheet. Meanwhile, when the interval between adjacent parallel Sn coating layers is too large, depending on the initial Sn plating layer thickness, the area of contact between the mating terminal and the Cu—Sn alloy coating layer is likely to be too large or too small, thereby causing an increase in insertion force (decrease in insertion-force-reducing effect) in any case. Therefore, the interval between adjacent parallel Sn coating layers should be 2000 μm or less. In light of the recent miniaturization of terminals, the parallel Sn coating layers preferably have a width of 1000 μm or less, and more preferably 250 μm or less. It is preferable that the width of the parallel Sn coating layers and the interval of adjacent parallel Sn coating layers are substantially constant, but this is not essential.

As shown in FIGS. 10A and 10B, the Cu—Sn alloy coating layer 102 exposed on the outermost surface protrudes in the height direction from the level of the parallel Sn coating layers 101 and the Sn coating layer 103. Therefore, when the surface roughness is measured in the direction of terminal insertion (indicated by a white arrow in FIGS. 8A, 8B, 9A, and 9B), for example, the Cu—Sn alloy coating layer 102 is measured as peaks of a roughness curve according to JIS B0601.

The present invention specifies the maximum height roughness Rz to be 10 µm or less (including 0 µm) in the direction of part (terminal) insertion. When the maximum height roughness Rz is larger, the surface area of the Cu—Sn alloy coating layer exposed on the outermost surface increases, and the corrosion resistance of the part surface decreases to increase the oxide amount, etc. The contact resistance is thus likely to increase, making it difficult to maintain electrical reliability. Further, when the depression 106 formed by surface-roughening the copper sheet is wide and deep in the copper sheet 105, its maximum height roughness Rz is large, but this is likely to cause deformation of the copper sheet 105. Therefore, the maximum height roughness Rz is 10 µm or less, and preferably more than 0 (somewhat protruding) to not more than 5 µm.

In the examples shown in FIGS. 9A and 9B, the two parallel Sn coating layer groups X and Y cross each other at right angles. However, the crossing angle can be suitably adjusted. When the two parallel Sn coating layer groups X and Y cross each other, the corner portions of the Cu—Sn alloy coating layer rise even higher (a corner at the position where two depressions cross each other in surface roughening rises), thereby increasing the insertion-force-reducing effect. However, when the width of the parallel Sn coating layers and the interval between adjacent parallel Sn coating layers are the same, the smaller the crossing angle, the wider the interval between the rises, thereby decreasing the insertion-force-reducing effect. Therefore, the crossing angle is preferably 10° to 90°.

The present invention also encompasses the case where three or more Sn coating layer groups cross one another in a grid pattern. Also in this case, the Sn coating layers of each Sn coating layer group have a width of 1 to 500 µm, and the interval between adjacent parallel Sn coating layers in one Sn coating layer Sn coating layer group is 1 to 2000 µm. The crossing angles of the Sn coating layer groups are also each preferably 10 to 90°.

In the mating-type connecting part according to the present invention, the angle defined by the part (terminal) insertion direction and the lengthwise direction of the Sn coating layer group should be suitably adjusted within a range of 0° to 90°. When the number of Sn coating layer groups is one, the angle is preferably more than 0° to 90°. A larger angle is more preferred, and the angle is more preferably 20° to 90°, and further preferably 90°. When the number of Sn coating layer groups is two or more, at least one Sn coating layer group is set to make the above angle with the insertion direction.

In the surface coating layer formed on the surface of the copper sheet, the Cu—Sn alloy coating layer is made of either or both of Cu6Sn5 and Cu3Sn and has an average thickness of 0.1 to 3.0 µm. This is on the same level as those of related art (JP-B-3926355 and JP-B-4024244). When the average thickness of the Cu—Sn alloy coating layer is less than 0.1 µm, the corrosion resistance of the material surface decreases to increase the oxide amount, etc. The contact resistance is thus likely to increase, making it difficult to maintain electrical reliability. Meanwhile, when the average thickness is more than 3.0 µm, this is disadvantageous in terms of cost, and productivity is also reduced. Therefore, the Cu—Sn alloy coating layer should have an average thickness of 0.1 to 3.0 µm, and more preferably 0.2 to 1.0 µm.

The Sn coating layer is made of a Sn metal or a Sn alloy. In the case of a Sn alloy, alloy elements may be Cu, Ag, Ni, Bi, Zn, and the like. These elements are preferably 10 mass or less. The Sn coating layer should have an average thickness of 0.2 to 5.0 µm. This is on the same level as those of related art (JP-B-3926355 and JP-B-4024244). When the average thickness of the Sn coating layer is less than 0.2 µm, this results in an increased amount of Cu oxide on the material surface due to thermal diffusion by high-temperature oxidation, etc. This is likely to cause an increase in contact resistance and a decrease in corrosion resistance, thereby making it difficult to maintain electrical reliability. Meanwhile, when the average thickness is more than 5.0 µm, this is disadvantageous in terms of cost, and productivity is also reduced. Therefore, the Sn coating layer should have an average thickness of 0.2 to 5.0 µm, and more preferably 0.5 to 3.0 µm.

As a part of the surface coating layer of the mating-type connecting part, a Ni coating layer may be formed between the surface of the copper sheet and the Cu—Sn alloy coating layer, and a Cu coating layer may be further formed between the Ni coating layer and the Cu—Sn alloy coating layer. A Cu coating layer may further be formed between the surface of the copper sheet for connecting parts and the Ni coating layer. These coating layers are all formed by plating. The Cu coating layer between the Ni coating layer and the Cu—Sn alloy coating layer is a Cu plating layer remaining under the Cu—Sn alloy coating layer after reflowing as mentioned above.

The Ni coating layer is made of metal Ni or a Ni alloy. In the case of a Ni alloy, alloy elements may be Cu, P, Co, and the like. Cu is preferably 40 mass % or less, and P and Co are preferably 10 mass % or less. The Ni coating layer preferably has an average thickness of 0.1 to 10 µm. The Cu coating layer is made of metal Cu or a Cu alloy. In the case of a Cu alloy, alloy elements may be Sn, Zn, and the like. Sn is preferably less than 50 mass %, and other elements are preferably 5 mass or less. The Cu coating layer preferably has an average thickness of 3.0 µm or less.

The following provides a supplementary explanation of the method for producing the mating-type connecting part.

As surface-roughening methods, JP-B-3926355, JP-B-4024244 and JP-A-2007-258156 disclose physical methods such as ion etching, chemical methods such as etching and electrolytic polishing, and mechanical methods such as rolling (using a work roll with a surface roughened by polishing, shot-blasting, etc.), polishing, and shot-blasting. However, such a method does not allow the formation of a Sn coating layer group observed as a plurality of parallel lines and a Cu—Sn alloy coating layer adjacent to each side thereof as mentioned above.

Meanwhile, JP-A-2008-269999 and JP-A-2008-274364 describe a technique of roughening the surface of a cupper sheet at the time of the formation of a terminal shape. That is, a copper sheet is stamped to form a copper sheet including terminal pieces connected in chains in the lengthwise direction via strip-like connecting portions. Also, at the same time as stamping or at an earlier or later time, the copper sheet is pressed to increase the surface roughness of the terminal piece plate surface (surface of the copper sheet). However, JP-A-2008-269999 or JP-A-2008-274364 nowhere describes a specific pressing process.

A Cu—Sn alloy coating layer is exposed in the area of projections on the surface of the surface-roughened copper sheet (depressions and projections are artificially formed) after reflowing. Therefore, the exposure of the Cu—Sn alloy coating layer or the Sn coating layer reflects the configuration of depressions and projections formed on the surface of the copper sheet during surface roughening.

Figure 11B:
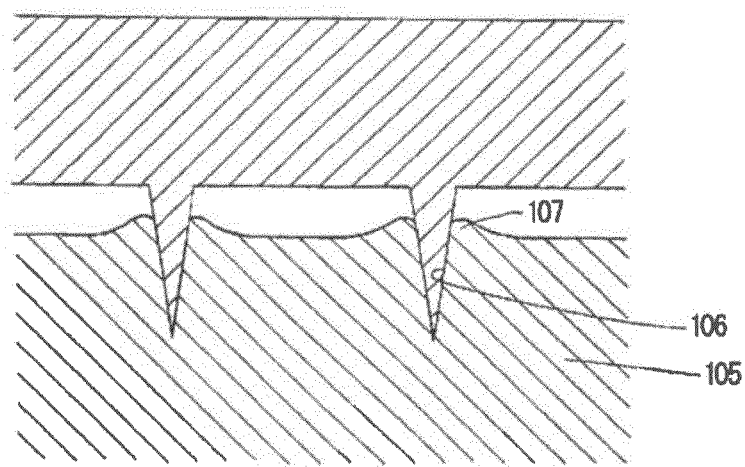

In the present invention, the method for surface roughening may be such that, as described above with reference to FIGS. 11A and 11B, a die with, on the pressing surface thereof, extremely fine depressions and projections formed in the form of parallel lines is mounted on a pressing machine, then the die is pressed against the surface of the copper sheet to press the projections (blade edges) into the surface of the copper sheet. This method allows the Cu—Sn alloy coating layer or the Sn coating layer to be exposed as specified by the present invention, and, in addition, the width of a Sn coating layer and the interval between Sn coating layers can be freely controlled.

The method for forming fine depressions and projections on the pressing surface of the die 108 may be electrical discharging, grinding, laser processing, or the like, and any of them can be selected according to the desired dimensional accuracy and processing shape. The projection shape and the formation pitch do not have to be constant.

After the copper sheet is stamped into a part shape and surface-roughened, the copper sheet is subjected to so-called post-plating. In the copper sheet, the region to be surface-treated and post-plated may entirely cover one or both surfaces of the copper sheet or may occupy only a portion of one or both surfaces. The treatments should be applied at least to the surface that serves as a sliding surface when the copper sheet is mated with the mating part.

Post-plating can be performed as follows. After performing Ni plating as required, a Cu plating layer and a Sn plating layer are formed in this order, and then reflowed to give post-plating. If necessary, it is also possible to form a Cu plating layer under the Ni plating layer for improving the adhesion of Ni plating. It is also possible that only a Sn plating layer is directly formed on the surface of the copper sheet.

When the post-plated copper sheet is reflowed, a Cu—Sn alloy coating layer is formed by the interdiffusion of Cu and Sn of the Cu plating layer and the Sn plating layer. At that time, the Sn plating layer remains, while the Cu plating layer may entirely disappear or partially remain. When the Cu plating layer partially remains, a Cu coating layer is formed between the surface of the copper sheet (in the case where a Ni layer is formed, the surface of the Ni layer) and the Cu—Sn alloy coating layer. In the case where a Ni layer is not formed, depending on the thickness of the Cu plating layer, Cu may also be supplied from the copper sheet (base material). When only a Sn plating layer is directly formed on the surface of the copper sheet, Cu in the copper sheet (base material) and Sn in the Sn plating layer undergo interdiffusion, thereby forming a Cu—Sn alloy coating layer.

The Cu plating layer preferably has an average thickness of 0.1 to 1.5 μm, the Sn plating layer preferably has an average thickness of 0.3 to 8.0 μm, and the Ni plating layer preferably has an average thickness of 0.1 to 10 μm.

In the present invention, the Cu plating layer, the Sn plating layer, and the Ni plating layer contain a Cu alloy, a Sn alloy, and a Ni alloy, respectively, in addition to the Cu, Sn, and Ni metals. When the Cu plating layer, the Sn plating layer, and the Ni plating layer are a Cu alloy, a Sn alloy, and a Ni alloy, the alloy elements of such alloys may be the same as in the alloys of the Cu coating layer, the Sn coating layer, and the Ni coating layer, respectively.

Hereinafter, main points of the present invention will be described in further detail with reference to Examples. However, the present invention is not limited to these Examples.

EXAMPLE 1

Production of Cu Alloy Base Material

In this example, a copper alloy strip containing Ni, Si, Zn, and Sn in amounts of 1.8 mass %, 0.40 mass %, 1.1 mass %, and 0.10 mass % based on Cu, respectively, and having a Vickers hardness of 180 and a thickness of 0.25 mmt was produced.

Figure 5:
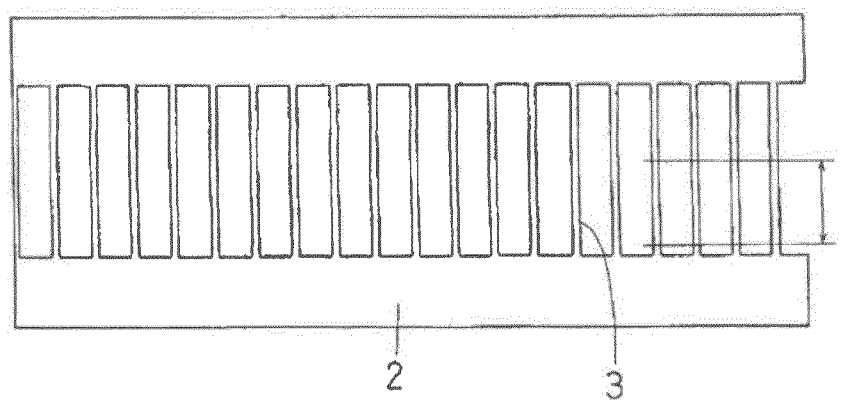
FIG. 5 is a plan view of a copper sheet after surface roughening in the Examples.

A specimen with a size of 100 mm×40 mm (rolling/longitudinal direction x perpendicular direction) was cut from the copper alloy strip. A part provided with predetermined depressions and projections on the pressing surface thereof was mounted at a predetermined position in a progressive die for forming pin terminals (position after the formation of the pin terminals), and pin terminal shapes with a size of 1 mm w×22 mm L were formed with a pitch of 5 mm. At the same time, a 1 mm w×10 mm L area of the surface of each pin terminal was surface-roughened. FIG. 5 shows a schematic diagram of the copper sheet after the formation and the surface roughening. In FIG. 5, 2 is the copper sheet, 3 is the pin terminal area, and the two direction arrow indicates the surface-roughened portion. By using parts with depressions and projections of different shapes, for example, various surface roughnesses can be obtained.

However, with respect to No. 11, which is a related-art material, following JP-B-3926355 and JP-B-4024244, the copper sheet was entirely surface-roughened by rolling with a work roll having a roughened surface, and the copper sheet was then formed into a pin terminal shape. With respect to No. 12, which also is a related-art material, no surface roughening was performed.

Subsequently, the surface roughness was measured by the following methods. The measured arithmetic mean roughness Ra, mean projection-depression interval RSm, Skewness Rsk, and protrusion peak portion height Rpk are shown in Table 1. The roughness curve, amplitude curve, and load curve of No. 1 are shown in FIGS. 1 to 3.

Method for Measurement of Surface Roughness

Using a contact roughness meter (TOKYO SEIMITSU CO, LTD; SURFCOM 1400), surface roughness was measured according to JIS B0601:2001 and JIS B0671:2002. The conditions for the measurement of surface roughness were as follows. With a cutoff value of 0.8 mm, a reference length of 0.8 mm, an evaluation length of 4.0 mm, a measurement rate of 0.3 mm/s, and a contact needle tip radius of 5 μm, measurements were made at several points along the direction of pin terminal insertion. Based on the roughness curve that provided the maximum arithmetic mean roughness Ra, each surface roughness parameter was determined. Further, with respect to test materials Nos.1 to 10 and 13 to 17, the arithmetic mean roughness Ra was measured also in other directions than the pin terminal insertion direction within the range ensuring an evaluation length of 4.0 mm. As a result, in these specimens, in every direction, the arithmetic mean roughness Ra was nearly the same as or less than the maximum of the arithmetic mean roughness Ra measured in the pin terminal insertion direction.

Subsequently, copper sheets Nos. 1 to 17 were plated with Cu and Sn, and then reflowed at 280° C. for 10 sec to give specimens. The Cu plating layer was formed to have an average thickness of 0.15 μm. The Sn plating layer was formed to have a varying average thickness of 0.7 μm, 1.0 μm, and 1.3 μm, so that the Sn coating layer after reflowing had a thickness of 0.4 μm, 0.7 μm, and 1.0 μm, respectively.

FIG. 6 shows the surface SEM (composition image) of Example 1 (thickness of Sn coating layer: 0.7 μm). In the figure, the white zone is the Sn coating layer, and the black zone is the Cu—Sn alloy coating layer, showing that the Cu—Sn alloy coating layer and the Sn coating layer are formed on the outermost surface (the Cu—Sn alloy coating layer is exposed through the Sn coating layer). In this example, Sn coating layers in the form of parallel lines cross each other at right angles in a grid pattern. The direction of each Sn coating layer is set at an angle of 45° relative to the terminal insertion direction. Also in Nos. 2 to 10 and 13 to 17, Sn coating layers in the form of parallel lines (including Sn coating layers in a grid pattern) are formed.

The average thicknesses of the Cu plating layer, the Sn plating layer, and the Sn coating layer are measured as follows.

Method for Measurement of Cu Plating Layer Average Thickness

A cross section of a test material processed by the microtome method before reflowing was observed using SEM (scanning electron microscope) at a magnification of 10,000×, and the average thickness of Cu plating was calculated by image analysis processing.

Method for Measurement of Sn Plating Layer Average Thickness

Using a fluorescent X-ray thickness gauge (Seiko Instruments Inc., SFT3200), the average thickness of Sn plating of a test material before reflowing was calculated. The measurement conditions were such that a monolayer calibration curve of Sn/base material was used as the calibration curve, and the collimator diameter was set at φ0.5 mm.

Method for Measurement of Sn Coating Layer Average Thickness

First, using a fluorescent X-ray thickness gauge (Seiko Instruments Inc., SFT3200), a test material was measured for the sum of the thickness of the Sn coating layer and the thickness of the Sn component contained in the Cu—Sn alloy coating layer. Subsequently, each test material was immersed in an aqueous solution of p-nitrophenol and caustic soda for 10 minutes to remove the Sn coating layer. The thickness of the Sn component contained in the Cu—Sn alloy coating layer was measured again using a fluorescent X-ray thickness gauge. The measurement conditions were such that a monolayer calibration curve of Sn/base material was used as the calibration curve, and the collimator diameter was set at φ0.5 mm. The measurement of the sum of the thickness of the Sn coating layer and the thickness of the Sn component contained in the Cu—Sn alloy coating layer was performed as follows. In the case of a 1-mm-wide specimen, measurement points were taken at the center position of a specimen in the width direction thereof (direction perpendicular to the longitudinal direction) and two positions across the center position where the end of an X-ray from a collimator is not applied to sags at the corner portions formed by stamping (three positions in total). In the case of a 3-mm-wide stamped material, measurement points were taken at the center position of a specimen in the width direction thereof (direction perpendicular to the longitudinal direction) and the positions 0.5 mm from the both ends (three positions in total). In each position, a point was taken at the position 1 mm from the lengthwise end, and points were also taken with a pitch of 0.5 mm from such a position along the longitudinal direction; ten points were selected in total. Thus, for each specimen, measurements were made at three positions×ten points (30 points in total), and the average thereof was calculated. The thickness of the Sn component contained in the Cu—Sn alloy coating layer was also measured in the same manner. The thickness of the Sn component contained in the Cu—Sn alloy coating layer was subtracted from the sum of the thickness of the Sn coating layer and the thickness of the Sn component contained in the Cu—Sn alloy coating layer, thereby calculating the average thickness of the Sn coating layer.

Subsequently, the obtained specimens were subjected to a friction coefficient evaluation test in the following manner. The results are shown in Table 1. In Table 1, regarding friction coefficient, the emboss-1.5 columns show friction coefficients where the inner diameter of the hemisphere of a female specimen is 1.5 mm, while the emboss-1.0 columns show friction coefficients where the inner diameter of the hemisphere of a female specimen is 1.0 mm.

Friction Coefficient Evaluation Test

Figure 7:
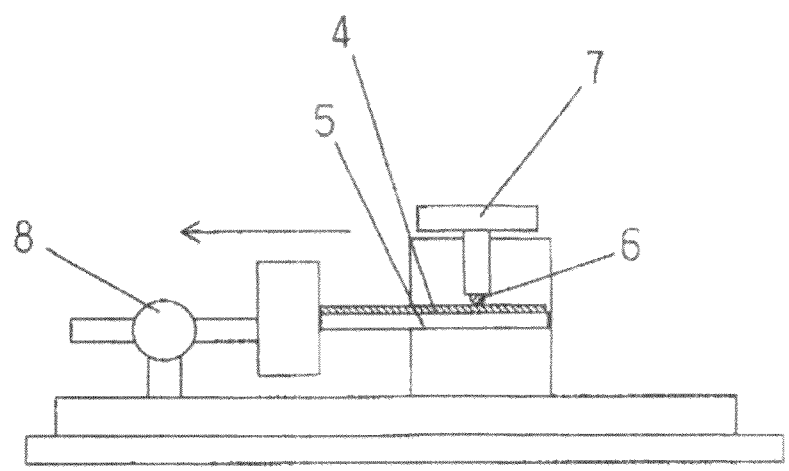
FIG. 7 is a schematic diagram of a jig for use in a friction coefficient evaluation test in the Examples.

The shape of an indented portion of an electrical contact in a mating-type connecting part was imitated, and the evaluation was performed using an apparatus as shown in FIG. 7. First, a male specimen 4 in the shape of a pin terminal cut from each test material (Nos. 1 to 17) was fixed on a horizontal platform 5, and a female specimen 6 was placed thereon to bring coating layers into contact with each other. The female specimen 6 is a processed hemisphere material (inner diameter: φ1.5 mm and φ1.0 mm) cut from a material obtained, using the base material No. 12, by plating a flat plate not formed into a terminal (Cu: 0.15 μm, Sn: 1.0 μm, reflowed). Subsequently, a load of 3.0 N (spindle 7) was applied to the female specimen 6 to press the male specimen 4, and, using a horizontal load measuring device (AIKOH ENGINEERING CO, LTD.; Model-2152), the male specimen 4 was pulled in the direction horizontal to the terminal insertion direction (sliding rate: 80 mm/min) to measure the maximum frictional force F until a sliding distance of 5 mm (unit: N). The friction coefficient was determined by the following formula (1). The reference numeral 8 is a load cell, and the arrow is the sliding direction.

$$\text{Friction coefficient} = F/3.0: \tag{1}$$

TABLE 1

| No. | Surface Roughness | | | | Sn Coating Layer | Friction Coefficient | |
|---|---|---|---|---|---|---|---|
| | Ra (μm) | RSm (mm) | Rsk | Rpk (μm) | Thickness (μm) | Emboss 1.5 | Emboss 1.0 |
| 1 | 1.87 | 0.08 | −0.76 | 0.32 | 0.4 | 0.28 | 0.31 |
| | | | | | 0.7 | 0.30 | 0.38 |
| | | | | | 1.0 | 0.34 | 0.52* |
| 2 | 1.47 | 0.09 | −1.01 | 0.40 | 0.4 | 0.28 | 0.29 |
| | | | | | 0.7 | 0.35 | 0.36 |
| | | | | | 1.0 | 0.36 | 0.50* |
| 3 | 0.96 | 0.08 | −1.50 | 0.39 | 0.4 | 0.32 | 0.30 |
| | | | | | 0.7 | 0.39 | 0.39 |
| | | | | | 1.0 | 0.39 | 0.49* |
| 4 | 0.60 | 0.08 | −1.70 | 0.32 | 0.4 | 0.31 | 0.33 |
| | | | | | 0.7 | 0.35 | 0.38 |
| | | | | | 1.0 | 0.39 | 0.54* |
| 5 | 1.20 | 0.04 | −1.23 | 0.31 | 0.4 | 0.35 | 0.33 |
| | | | | | 0.7 | 0.38 | 0.36 |
| | | | | | 1.0 | 0.39 | 0.39 |
| 6 | 3.4 | 0.29 | −0.08 | 0.89 | 0.4 | 0.26 | 0.32 |
| | | | | | 0.7 | 0.33 | 0.55* |
| 7 | 3.8 | 0.11 | −0.02 | 0.96 | 0.4 | 0.26 | 0.32 |
| | | | | | 0.7 | 0.29 | 0.35 |
| | | | | | 1.0 | 0.32 | 0.50* |
| 8 | 0.32* | 0.08 | −1.82 | 0.15 | 0.4 | 0.35 | 0.39 |
| | | | | | 0.7 | 0.42* | 0.53* |
| 9 | 0.32* | 0.32* | −2.63 | 0.11 | 0.4 | 0.41* | 0.53* |
| | | | | | 0.7 | 0.53* | 0.58* |
| 10 | 1.67 | 0.75* | −2.25 | 0.21 | 0.4 | 0.55* | 0.58* |
| | | | | | 0.7 | 0.56* | 0.60* |
| 11 | 0.61 | 0.16 | 0.51* | 1.10* | 0.4 | 0.36 | 0.53* |
| | | | | | 0.7 | 0.40* | 0.58* |
| 12 | 0.04* | 0.02 | −0.76 | 0.04 | 0.4 | 0.45* | 0.47* |
| | | | | | 0.7 | 0.56* | 0.59* |
| 13 | 3.0 | 0.03 | −0.06 | 0.83 | 0.4 | 0.25 | 0.27 |
| | | | | | 0.7 | 0.30 | 0.32 |
| | | | | | 1.0 | 0.35 | 0.37 |
| 14 | 1.24 | 0.08 | −1.21 | 0.52 | 0.4 | 0.24 | 0.30 |
| | | | | | 0.7 | 0.36 | 0.39 |
| | | | | | 1.0 | 0.42* | 0.45* |
| 15 | 2.7 | 0.09 | −0.08 | 0.05 | 0.4 | 0.33 | 0.38 |
| | | | | | 0.7 | 0.36 | 0.42* |
| | | | | | 1.0 | 0.38 | 0.55* |

TABLE 1-continued

| No. | Surface Roughness | | | | Sn Coating Layer | Friction Coefficient | |
| --- | --- | --- | --- | --- | --- | --- | --- |
| | Ra (μm) | RSm (mm) | Rsk | Rpk (μm) | Thickness (μm) | Emboss 1.5 | Emboss 1.0 |
| 16 | 1.33 | 0.08 | −1.25 | 0.25 | 0.4 | 0.33 | 0.39 |
| | | | | | 0.7 | 0.35 | 0.43* |
| | | | | | 1.0 | 0.37 | 0.54* |

*Outside the specified range or with inferior characteristics

As shown in Table 1, Nos. 1 to 7 and 13 to 16 satisfy the requirements specified by the present invention in terms of surface roughness. In the case of emboss 1.5, even when the thickness of the Sn coating layer is 0.7 μm, the friction coefficient is less than 0.4, showing excellent characteristics.

Of these, Nos. 1 to 5, 7, 13 and 14 each have a protrusion peak portion height Rpk within a range of 0.3 to 1 μm. Thus, on the peak portions expressed by the mean projection-depression interval RSm, there is a portion further protruding from the surface. Accordingly, even in the case of emboss 1.0, when the thickness of the Sn coating layer is 0.7 μm, the friction coefficient is as small as less than 0.4. No. 6 has a mean projection-depression interval RSm as relatively large as 0.29 mm. In the case of emboss 1.0, when the Sn coating layer thickness is 0.7 μm, the friction coefficient is as high as 0.55.

Meanwhile, No. 8 has an arithmetic mean roughness Ra of 0.32 μm and thus has small depressions and projections on the surface. Therefore, when the thickness of the Sn coating layer is 0.7 μm, the friction coefficient is large. No. 9 has a small arithmetic mean roughness Ra and also has a large mean projection-depression interval RSm. Therefore, even when the thickness of the Sn coating layer is 0.4 μm, the friction coefficient is large. No. 10 has a large mean projection-depression interval RSm, so the friction coefficient is large. No. 11 is an example of related art. Although it satisfies the specified range in terms of arithmetic mean roughness Ra and mean projection-depression interval RSm, because the skewness Rsk is on the+side, even in the case of emboss 1.5, when the thickness of the Sn coating layer is 0.7 μm, the friction coefficient is large. No. 12 is another example of related art. It has a small arithmetic mean roughness Ra, so the friction coefficient is large.

EXAMPLE 2

In addition to Nos. 4, 5, 7, 13, and 14 used in Example 1, No. 17 was newly formed, surface-roughened, plated, and reflowed in the same manner as in Example 1 to prepare specimens. Subsequently, the surface roughness (including protrusion valley portion depth Rvk), the thickness of the Sn coating layer, and the friction coefficient were measured in the same manner. Nos. 4 and 17, as well as Nos. 5 and 14, are similar to each other in terms of arithmetic mean roughness Ra, mean projection-depression interval RSm, skewness Rsk, and protrusion peak portion height Rpk, and are different from each other in terms of protrusion valley portion depth Rvk. Further, Nos. 4, 5, 7, 13, 14, and 17 were measured for contact resistance after high-temperature storage as follows. The results are shown in Table 2.

Contact Resistance Evaluation Test after High-Temperature Storage

Each test material was heat-treated in air at 160° C. for 120 hours and 500 hours, and then measured for contact resistance by a four-probe method under the following conditions: open-circuit voltage, 20 mV; current, 10 mA; no sliding.

TABLE 2

| No. | Surface Roughness | | | | | Sn Coating Layer | Friction Coefficient Emboss 1.5 | Heat Resistance 160° C. | |
| --- | --- | --- | --- | --- | --- | --- | --- | --- | --- |
| | Ra (μm) | RSm (mm) | Rsk | Rpk (μm) | Rvk (μm) | Thickness (μm) | | 120 hr (mΩ) | 500 hr (mΩ) |
| 4 | 0.60 | 0.08 | −1.70 | 0.32 | 2.56 | 0.4 | 0.31 | 0.4 | 1.0 |
| | | | | | | 0.7 | 0.35 | 0.4 | 0.8 |
| | | | | | | 1.0 | 0.39 | 0.3 | 0.6 |
| 5 | 1.20 | 0.04 | −1.23 | 0.31 | 3.23 | 0.4 | 0.35 | 0.7 | 1.2* |
| | | | | | | 0.7 | 0.38 | 0.5 | 1.1* |
| | | | | | | 1.0 | 0.39 | 0.4 | 0.7 |
| 7 | 3.8 | 0.11 | −0.02 | 0.96 | 14 | 0.4 | 0.26 | 0.8 | 1.5* |
| | | | | | | 0.7 | 0.29 | 0.6 | 1.3* |
| | | | | | | 1.0 | 0.32 | 0.5 | 0.9 |
| 13 | 3.0 | 0.03 | −0.06 | 0.83 | 5.5 | 0.4 | 0.25 | 0.7 | 2.1* |
| | | | | | | 0.7 | 0.30 | 0.5 | 1.3* |
| | | | | | | 1.0 | 0.35 | 0.4 | 0.8 |
| 14 | 1.24 | 0.08 | −1.21 | 0.52 | 1.83* | 0.4 | 0.24 | 0.6 | 1.2* |
| | | | | | | 0.7 | 0.36 | 0.5 | 1.0 |
| | | | | | | 1.0 | 0.42* | 0.3 | 0.8 |
| 17 | 0.63 | 0.08 | −1.82 | 0.25 | 1.33* | 0.4 | 0.33 | 0.6 | 1.1* |
| | | | | | | 0.7 | 0.39 | 0.5 | 1.0 |
| | | | | | | 1.0 | 0.55* | 0.3 | 0.7 |

*Outside the specified range or with inferior characteristics

As shown in Table 2, Nos. 4, 5, 7, 13, 14, and 17 all satisfy the requirements in terms of arithmetic mean roughness Ra, mean projection-depression interval RSm, skewness Rsk, and protrusion peak portion height Rpk. Accordingly, when the thickness of the Sn coating layer is 0.7 μm, the friction coefficient is as small as less than 0.4. Of these, particularly Nos. 4, 5, 7, and 13 are within the specified range in terms of protrusion valley portion depth Rvk, and even when the thickness of the Sn coating layer is 1.0 μm, the friction coefficient is as small as less than 0.4.

Meanwhile, Nos. 14 and 17 are outside the specified range in terms of protrusion valley portion depth Rvk, and when the thickness of the Sn coating layer is 1.0 μm, the friction coefficient is 0.4 or more. In Nos. 14 and 15, in order to for the contact resistance to be less than 1.0 mΩ after heating at 160° C. for 500 hours, it is neccessary that the Sn coating thickness is 1.0 μm or more. Accordingly, it is difficult to achieve both a low friction coefficient and high contact reliability. However, in Nos. 4, 5, 7, and 13 having Rvk within the specified range, the Sn coating thickness can be 1.0 μm, and it is possible to achieve both a low friction coefficient and high contact reliability.

EXAMPLE 3

Production of Copper Plate Material (Plated Base Material)

In this example, as in the paragraph [0060], a copper alloy strip containing Ni, Si, Zn, and Sn in amounts of 1.8 mass %, 0.40 mass %, 1.1 mass %, and 0.10 mass % based on Cu, respectively, and having a Vickers hardness of 180 and a thickness of 0.25 mmt was produced.

Figure 12:
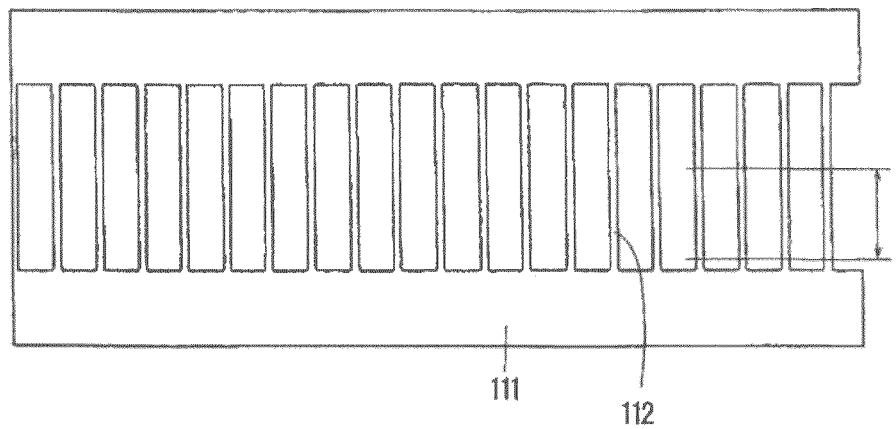
FIG. 12 is a plan view of a copper sheet after surface roughening in the Examples.

A specimen with a size of 100 mm×40 mm (rolling/longitudinal direction×perpendicular direction) was cut from the copper alloy strip. A part provided with predetermined depressions and projections on the pressing surface thereof was mounted at a predetermined position in a progressive die for forming pin terminals (position after the formation of the pin terminals), and pin terminal shapes with a size of 1 mm w×22 mm L were formed with a pitch of 5 mm. At the same time, a 1 mm w×10 mm L area of the surface of each pin terminal was surface-roughened. FIG. 12 shows a schematic diagram of the copper sheet after the terminal formation and the surface roughening. In FIG. 12, 111 is the copper sheet, 112 is the pin terminal area, and the two direction arrow indicates the surface-roughened portion. By using parts with depressions and projections of different shapes or by performing stamping several times, for example, various surface configurations can be obtained.

Subsequently, the copper sheets Nos. 101 to 106 were plated with Ni (partially not plated) and then with Cu and Sn, and then reflowed at 280° C. for 10 sec to give specimens.

Figure 13B:
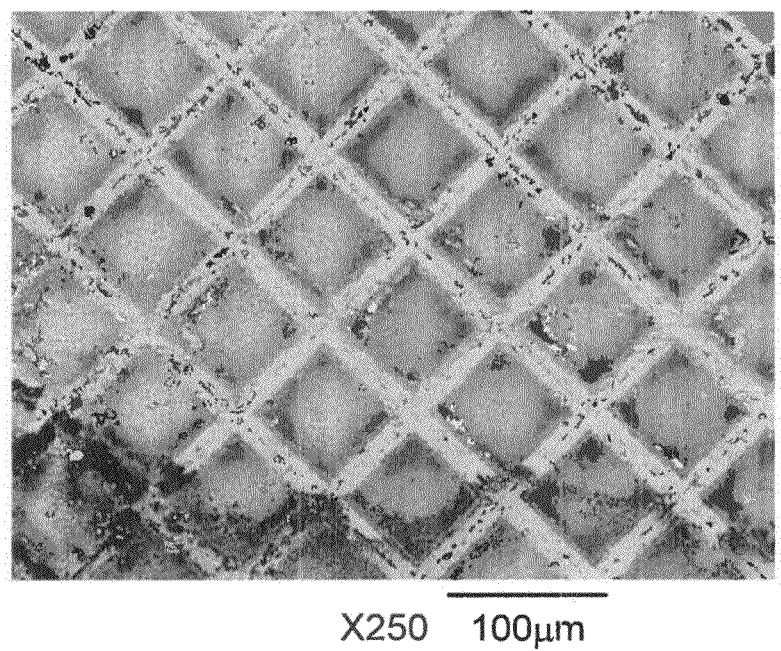

FIG. 13 shows the surface SEM (composition image) of No. 101. In the figure, the white zone is the Sn coating layer, and the black zone is the Cu—Sn alloy coating layer. The Sn coating layer includes two Sn coating layer groups each observed as a plurality of parallel lines, and one Sn coating layer group and the other Sn coating layer group cross each other at an angle of 90°, making a grid pattern as a whole. In this example, after surface roughening and before plating, fine grooves (valleys) observed as a plurality of parallel lines are formed on the surface of the pin terminal in such a manner that they cross one another at an angle of 90°, and such grooves form a grid pattern as a whole.

Table 3 shows the surface configuration and the average thickness of each coating layer of each specimen. In Table 3, the straight line X indicates a Sn coating layer constituting one Sn coating layer group, and the straight line Y indicates a Sn coating layer constituting the other Sn coating layer group. When there is only one Sn coating layer group, the straight line Y column is blank. With respect to each specimen, each parameter of the surface configuration and the average thickness of each coating layer are measured as follows.

Maximum Height Roughness Rz

The measurement was performed using a contact roughness meter (TOKYO SEIMITSU CO, LTD; SURFCOM 1400) according to JIS B0601:2001. The conditions for the measurement of surface roughness were as follows. With a cutoff value of 0.8 mm, a reference length of 0.8 mm, an evaluation length of 4.0 mm, a measurement rate of 0.3 mm/s, and a contact needle tip radius of 5 μmR, measurements were made at several points along the direction of pin terminal insertion. The maximum height roughness Rz was determined from each obtained roughness curve, and the maximum thereof was used as the maximum height roughness Rz of the specimen. The values of maximum height roughness Rz were nearly the same at all the measurement points. FIG. 13 shows an example of the roughness curve measured from No. 101.

Sn Layer Width and the Like

The surface of a specimen was observed using a scanning electron microscope, and, from its composition image, the Sn coating layer width (X, Y) and the intervals of the straight lines X and Y were measured. The crossing angle between X and Y and the crossing angle between X and the insertion direction were adjusted in the stage of surface roughening.

Coating Layer Thickness

A specimen was cut along a cross section perpendicular to the Sn coating layers observed in the form of parallel lines, and the central part of the cross section was observed using a scanning electron microscope. The composition image was subjected to image analysis processing to calculate the average thicknesses of the Ni coating layer, the Cu—Sn alloy coating layer, and the Sn coating layer. In all cases, the Cu coating layer had disappeared.

TABLE 3

| | Configuration of Surface Coating Layer | | | | | | | | |
|---|---|---|---|---|---|---|---|---|---|
| | Maximum Height Roughness | Width of Sn Coating Layer X, Y | Straight Line Interval | | Crossing Angle between X and Y | Crossing Angle between X and Insertion Direction | Thickness of Surface Coating Layer | | |
| | | | Straight Line X | Straight Line Y | | | Sn | Cu—Sn | Ni |
| No. | Rz (μm) | (μm) | (μm) | (μm) | (°) | (°) | (μm) | (μm) | (μm) |
| 101 | 32 | 20 | 80 | 80 | 90 | 45 | 0.7 | 0.3 | 0.5 |
| 102 | 2.2 | 15 | 80 | 80 | 90 | 45 | 0.7 | 0.3 | 0.5 |
| 103 | 0.9 | 70 | 80 | 80 | 90 | 45 | 1.5 | 0.4 | 0.5 |
| 104 | 2.7 | 20 | 80 | — | — | 90 | 0.7 | 0.3 | 0.5 |
| 105 | 2.3 | 25 | 80 | — | — | 90 | 0.7 | 0.3 | 0.5 |
| 106 | 1.8 | 8 | 40 | — | — | 90 | 0.7 | 0.3 | 1.0 |
| 107 | 8.3 | 15 | 300 | 300 | 90 | 90 | 0.7 | 0.3 | 10.0 |
| 108 | 1.1 | 200 | 300 | 300 | 90 | 90 | 5.0 | 2.6 | — |
| 109 | 3.4 | 25 | 750 | 750 | 90 | 90 | 0.7 | 0.3 | — |
| 110 | <0.1 | 450 | 1000 | 1000 | 90 | 30 | 4.0 | 1.0 | 2.0 |

TABLE 3-continued

| | Configuration of Surface Coating Layer | | | | | | | |
|---|---|---|---|---|---|---|---|---|
| | Maximum Height Roughness | Width of Sn Coating | Straight Line Interval | | Crossing Angle | Crossing Angle between X and Insertion | Thickness of Surface Coating Layer | | |
| No. | Rz (μm) | Layer X, Y (μm) | Straight Line X (μm) | Straight Line Y (μm) | between X and Y (°) | Direction (°) | Sn (μm) | Cu—Sn (μm) | Ni (μm) |
| 111 | 0.2 | 1 | 3 | 3 | 10 | 90 | 0.2 | 0.1 | 0.1 |
| 112 | 5.3 | 100 | 300 | 300 | 60 | 60 | 0.7 | 0.3 | 0.5 |
| 113 | 10.0 | 500 | 2000 | 2000 | 90 | 45 | 3.0 | 1.0 | 5.0 |
| 114 | 14.9* | 300 | 1500 | 1500 | 90 | 30 | 0.7 | 0.3 | — |
| 115 | 5.1 | 700* | 2000 | — | — | 90 | 5.0 | 1.0 | 5.0 |
| 116 | 1.7 | 20 | 3000* | 3000* | 90 | 90 | 0.7 | 0.3 | 0.5 |

*Outside the specified range

Subsequently, the obtained specimens were subjected to a friction coefficient evaluation test and a contact resistance evaluation test after high-temperature storage in the following manner. The result is shown in Table 4. In Table 4, regarding friction coefficient, the emboss-1.5 columns show the friction coefficient where the inner diameter of the hemisphere of a female specimen is 1.5 mm, while the emboss-1.0 columns show the friction coefficient where the inner diameter of the hemisphere of a female specimen is 1.0 mm. The columns for tongue in Table 4 show friction coefficients in the case where the female specimen was a 10-mm-wide curved tongue (curvature radius: 2 mm).

Friction Coefficient Evaluation Test

Figure 14:
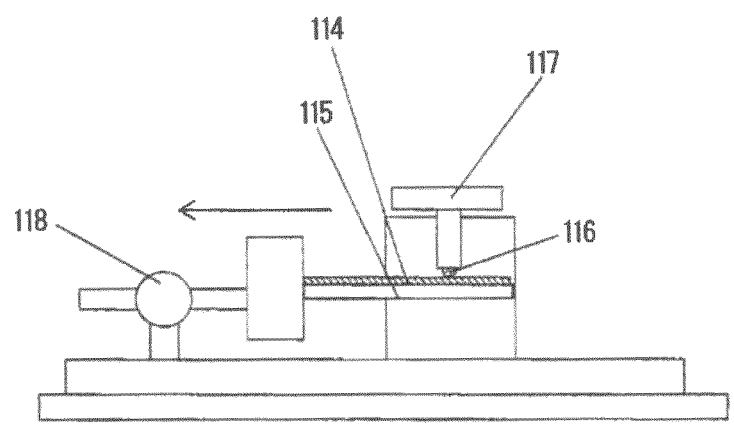
FIG. 14 is a schematic diagram of a jig for use in a friction coefficient evaluation test in the Examples.

The shape of an indented portion of an electrical contact in a mating-type connecting part was imitated, and the evaluation was performed using an apparatus as shown in FIG. 14. First, a male specimen 114 in the shape of a pin terminal cut from each test material (Nos. 101 to 116) was fixed on a horizontal platform 115, and a female specimen 116 was placed thereon to bring coating layers into contact with each other. The female specimen 116 is a processed hemisphere material (inner diameter: φ1.5 mm and φ1.0 mm) or a shaped tongue cut from a material obtained by plating a not-surface-roughened copper sheet (Cu: 0.15 μm, Sn: 1.0 μm, reflowed). Subsequently, a load of 3.0 N (spindle 117) was applied to the female specimen 106 to press the male specimen 114, and, using a horizontal load measuring device (AIKOH ENGINEERING CO, LTD; Model-2152), the male specimen 114 was pulled in the direction horizontal to the terminal insertion direction (sliding rate: 80 mm/min) to measure the maximum frictional force F until a sliding distance of 5 mm (unit: N). The friction coefficient was determined by the above formula (1). The reference numeral 118 is a load cell, and the arrow is the sliding direction.

Contact Resistance Evaluation Test after High-Temperature Storage

Each test material was heat-treated in air at 160° C. for and 500 hours, and then measured for contact resistance by a four-probe method under the following conditions: open-circuit voltage, 20 mV; current, 10 mA; no sliding. After heating at 160° C. for 500 hours, a specimen with a contact resistance of less than 1.0 mΩ was evaluated as having excellent heat resistance (○), while one with a contact resistance of 1.0 μmΩ or more was evaluated as having poor heat resistance (×).

TABLE 4

| | Friction Coefficient | | | Contact Resistance after Heating |
|---|---|---|---|---|
| No. | Emboss 1.5 | Emboss 1.0 | Tongue | (mΩ) |
| 101 | 0.30 | 0.38 | | ○ |
| 102 | 0.35 | 0.36 | | ○ |
| 103 | 0.39 | 0.53* | | ○ |
| 104 | 0.39 | 0.39 | | ○ |
| 105 | 0.35 | 0.38 | | ○ |
| 106 | 0.38 | 0.36 | | ○ |
| 107 | 0.33 | 0.55* | | ○ |
| 108 | 0.37 | 0.45* | | ○ |
| 109 | 0.56* | 0.60* | 0.39 | ○ |
| 110 | 0.48* | 0.59* | 0.38 | ○ |
| 111 | 0.33 | 0.37 | 0.36 | ○ |
| 112 | 0.42* | 0.48* | 0.32 | ○ |
| 113 | 0.55* | 0.57* | 0.31 | ○ |
| 114 | 0.46* | 0.50* | 0.3 | X |
| 115 | 0.50* | 0.45* | 0.43* | ○ |
| 116 | 0.43* | 0.42* | 0.45* | ○ |

*With inferior properties

As shown in Table 4, Nos. 101 to 113 satisfy the requirements of the present invention in terms of the Sn coating layer width and interval, as well as maximum height roughness Rz. At least when the mating material is a tongue, the friction coefficient is as low as 0.4. In particular, when the parameters are within a preferred range, that is, when the maximum height roughness Rz is 0.1 to 5 μm, the Sn coating layer width (lines X and Y) is 50 μm or less, and the interval between adjacent Sn coating layers (interval between adjacent lines X and X, interval between adjacent lines Y and Y) is 250 μm or less, even in the case of emboss 1.0 mm, the friction coefficient is as small as less than 0.4.

Meanwhile, in the case of No. 114, the maximum height roughness Rz is too large, and thus the contact resistance after heating is high. In the case of No. 115, the Sn coating layer width is too large, and thus the friction coefficient is high. In the case of No. 116, the Sn coating layer intervals (interval between adjacent lines X and X, intervals between adjacent lines Y and Y) is too large, and thus the friction coefficient is high.

What is claimed is:

1. A mating-type connecting part, comprising, on an outermost surface thereof on a side that is contact with a mating part, a mixture of a Cu-Sn alloy coating layer and a Sn coating layer, the Sn coating layer being smoothed by reflowing, wherein the Sn coating layer comprises a Sn coating layer group as a plurality of continuous parallel lines;
the Cu-Sn alloy coating layer is adjacent to each side of each of Sn coating layers constituting the Sn coating layer group;
a maximum height roughness Rz is 10 μm or less in the direction of part insertion;
the connecting part is obtained by a process comprising post-plating and reflowing a copper sheet stamped into a predetermined shape; and
wherein, in the Sn coating layer group as a plurality of continuous parallel lines, the lines satisfy either or both of conditions (A)-(B):
(A) the lines have substantially constant width and are spaced at substantially regular intervals, and/or
(B) the lines have substantially constant width over a continuous length thereof.

2. The mating-type connecting part according to claim 1, wherein the Sn coating layers of the Sn coating layer group have a width of from 1 to 500 μm, and, of the Sn coating layers of the Sn coating layer group, an interval between adjacent Sn coating layers is from 1 to 2000 μm.

3. A mating-type connecting part, comprising, on an outermost surface thereof on a side that is contact with a mating terminal, a mixture of a Cu-Sn alloy coating layer and a Sn coating layer, the Sn coating layer being smoothed by a reflowing process,
wherein the Sn coating layer comprises a Sn coating layer group as a plurality of continuous parallel lines;
one or more additional Sn coating layer groups are each present as a plurality of continuous parallel lines;
the Sn coating layer groups cross each other in a grid pattern;
the Cu-Sn alloy coating layer is adjacent to each side of each of Sn coating layers constituting each Sn coating layer group;
a maximum height roughness Rz is 10 μm or less in the direction of part insertion;
the connecting part is obtained by a process comprising post-plating and reflowing a copper sheet stamped into a predetermined shape;
wherein, in the Sn coating layer, lines of the plurality of continuous parallel lines satisfy (A1), (B1), (C1), (D1), or any combination thereof:
(A1) the lines have substantially constant width and are spaced at substantially regular intervals,
(B1) the lines have substantially constant width over a continuous length thereof,
(C1) the lines are continuous for at least a length that crosses more than one line in the one or more additional Sn coating layer groups, and/or
(D1) the lines have constant width for at least a length that crosses more than one line in the one or more additional Sn coating layer groups;
and
wherein, in the one or more additional Sn coating layer groups, lines of the plurality of continuous parallel lines satisfy (A2), (B2), (C2), (D2), or any combination thereof:
(A2) the lines have substantially constant width and are spaced at substantially regular intervals,
(B2) the lines have substantially constant width over a continuous length thereof,
(C2) the lines are continuous for at least a length that crosses more than one line in the Sn coating layer, and/or
(D2) the lines have constant width for at least a length that crosses more than one line in the Sn coating layer.

4. The mating-type connecting part according to claim 3, wherein the Sn coating layers of the Sn coating layer group have a width of from 1 to 500 μm, and, of the Sn coating layers of one Sn coating layer group, an interval between adjacent Sn coating layers is from 1 to 2000 μm.

5. The mating-type connecting part according to any one of claims 1 to 4, wherein the copper sheet is surface-roughened prior to post-plating, and a surface thereof has depressions observed as a plurality of parallel lines formed therein by pressing process.

6. The mating-type connecting part according to any one of claims 1 to 4, wherein the Cu-Sn alloy coating layer and the Sn coating layer are formed in this order as a surface plating layer on the surface of the copper sheet, and a portion of the Cu-Sn alloy coating layer is exposed on an outermost surface of the mating-type connecting part.

7. The mating-type connecting part according to claim 6, wherein the Cu-Sn alloy coating layer has an average thickness of from 0.1 to 3 μm, and the Sn coating layer has an average thickness of from 0.2 to 5.0 μm.

8. The mating-type connecting part according to claim 5, comprising a Ni coating layer between the surface of the copper sheet and the Cu-Sn alloy coating layer.

9. The mating-type connecting part according to claim 8, further comprising a Cu coating layer between the Ni coating layer and the Cu-Sn alloy coating layer.

10. The mating-type connecting part according to claim 8, further comprising a Cu coating layer between the surface of the copper sheet and the Ni coating layer.

11. A method for producing the mating-type connecting part according to any one of claims 1 to 4, the method comprising:
at the same time as stamping a copper sheet or at an earlier or later time, pressing a surface of the copper sheet, thereby surface-roughening the copper sheet and forming depressions observed as a plurality of parallel lines, and then
post-plating the surface of the surface-roughened copper sheet, followed by
reflowing, thereby obtaining the connecting part.

12. The mating-type connecting part of claim 1, wherein, in the Sn coating layer group as a plurality of continuous parallel lines, the lines have substantially constant width and are spaced at substantially regular intervals.

13. The mating-type connecting part of claim 3,
wherein, in the Sn coating layer, lines of the plurality of continuous parallel lines have substantially constant width and are spaced at substantially regular intervals, and
wherein, in the one or more additional Sn coating layer groups, lines of the plurality of continuous parallel lines have substantially constant width and are spaced at substantially regular intervals.

14. The mating-type connecting part of claim 1, wherein, in the Sn coating layer group as a plurality of continuous parallel lines, the lines have substantially constant width over a continuous length thereof.

15. The mating-type connecting part of claim 3,
wherein, in the Sn coating layer, lines of the plurality of continuous parallel lines have substantially constant width over a continuous length thereof, and
wherein, in the one or more additional Sn coating layer groups, lines of the plurality of continuous parallel lines have substantially constant width over a continuous length thereof.

16. The mating-type connecting part of claim 3,
wherein, in the Sn coating layer, lines of the plurality of continuous parallel lines are continuous for at least a length that crosses more than one line in the one or more additional Sn coating layer groups, and
wherein, in the one or more additional Sn coating layer groups, lines of the plurality of continuous parallel lines are continuous for at least a length that crosses more than one line in the Sn coating layer.

17. The mating-type connecting part of claim 3,
wherein, in the Sn coating layer, lines of the plurality of continuous parallel lines have constant width for at least a length that crosses more than one line in the one or more additional Sn coating layer groups, and
wherein, in the one or more additional Sn coating layer groups, lines of the plurality of continuous parallel lines have constant width for at least a length that crosses more than one line in the Sn coating layer.

* * * * *